US007822633B2

(12) United States Patent
Neuberger et al.

(10) Patent No.: US 7,822,633 B2
(45) Date of Patent: Oct. 26, 2010

(54) PUBLIC SECTOR VALUE MODEL

(75) Inventors: Lisa H. Neuberger, San Francisco, CA (US); Timothy P. Rogers, South Boston, MA (US); Greg Wilkinson, London (GB); Greg Beales, London (GB); Jonathan Garbutt, London (GB); Nicholas Martin Stevens, London (GB); George F. Chaplin, Suwanee, GA (US); Fiona Sharples, Bucks (GB); Sajaad Jetha, Surrey (GB); Nicholas Marren, London (GB); Thomas P. Leary, London (GB); Mark Younger, London (GB); Emma Jones, London (GB); Christopher Lane, Winchester (GB)

(73) Assignee: Accenture Global Services Limited, Dublin (IE)

( * ) Notice: Subject to any disclaimer, the term of this patent is extended or adjusted under 35 U.S.C. 154(b) by 1690 days.

(21) Appl. No.: 10/664,797

(22) Filed: Sep. 16, 2003

(65) Prior Publication Data

US 2004/0128187 A1 Jul. 1, 2004

Related U.S. Application Data

(60) Provisional application No. 60/426,503, filed on Nov. 15, 2002.

(51) Int. Cl.
*G06F 17/60* (2006.01)
(52) U.S. Cl. ...................................................... 705/11
(58) Field of Classification Search .................... 705/11
See application file for complete search history.

(56) References Cited

U.S. PATENT DOCUMENTS

| 6,859,785 B2* | 2/2005 | Case ........................ 705/36 R |
| 2002/0019765 A1* | 2/2002 | Mann et al. ................... 705/11 |
| 2003/0033233 A1* | 2/2003 | Lingwood et al. ............. 705/36 |
| 2004/0068431 A1* | 4/2004 | Smith et al. ................... 705/10 |

OTHER PUBLICATIONS

Mechling et al, "Defining and Measuring Success In Canadian Public Sector Electronic Service Delivery", Issue Paper Prepared for Discussion and Debate at Lac Carling V, Apr. 24, 2001.*
Spears et al, "Citizens First 2000", Public Sector Service Delivery Council and The Institute of Public Administration of Canada, 2001.*
Brignall et al, "An institutional perspective on performance measurement and manadement in the 'new public secotr'", Management Accounting Research, 2000, 11, 281-306.*
Australian Office Action issued in Application No. 2003288677, dated Dec. 16, 2008, 2 pages.
International Search Report & Declaration of Non-Establishment, issued in Application No. PCT/IB03/06312, mailed May 19, 2004, 5 pages.
European Office Action issued in Application No. 03 780 523.1, dated Mar. 13, 2008, 5 pages.

* cited by examiner

*Primary Examiner*—Beth V Boswell
*Assistant Examiner*—Thomas Mansfield
(74) *Attorney, Agent, or Firm*—Fish & Richardson P.C.

(57) ABSTRACT

A method and system for evaluating a public sector organization includes identifying at least one outcome measure and at least one cost-effectiveness measure for a public sector organization; obtaining measurements associated with the measure; and determining a relative public performance measure of the public sector organization based on the measurements.

47 Claims, 20 Drawing Sheets

- "Outcomes" are a Weighted Basket of Social Achievements
- "Cost Effectiveness" =
$$\frac{\text{Outcomes}}{(\text{Annual Expenditure} - \text{Cap Ex} + \text{Capital Charge})}$$
- Hypothesis = Greater Value is Created Through Generating Improved Outcomes in a More Cost Effective Way

- Different Combinations of Growth and Spread Drive Intrinsic Value Creation for Shareholders and Stakeholders

- Enterprises can Map their Future Trajectory and Take Appropriate Action (Long Term Strategy and/or Immediate)

- "Outcomes" are a Weighted Basket of Social Achievements

- "Cost Effectiveness" =
$$\frac{\text{Outcomes}}{(\text{Annual Expenditure} - \text{Cap Ex} + \text{Capital Charge})}$$

- Hypothesis = Greater Value is Created Through Generating Improved Outcomes in a More Cost Effective Way

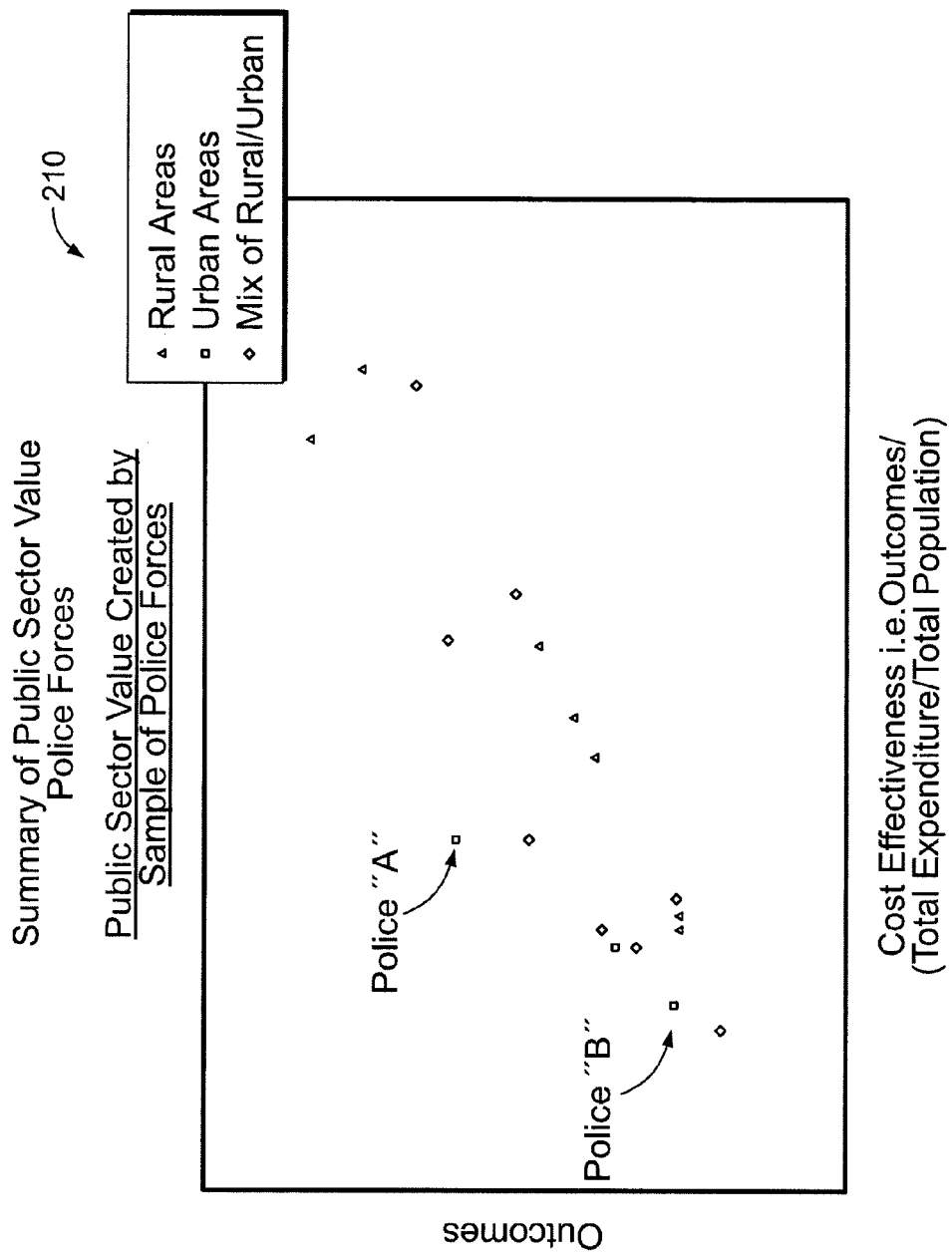

Value Driver Analysis - Police Force with Low Cost-Effectiveness Police "A"

| Strategic Value Levers | Accenture Market Offerings |
|---|---|
| Reduce Variable Costs ⇧<br>• Reduce Labour Costs<br>• Reduce Purchasing Costs | • Human Performance<br>• Integrated Web Services<br>• Procurement Process Enhancement<br>• eProcurement<br>• Supplier Managed Procurement |
| Reduce Fixed Costs ⇧<br>• Reduce Marketing Costs<br>• Reduce IT Spend<br>• Reduce HR Admin / Training Costs<br>• Reduce Premises/Transport Costs | • Customer Relationship Management<br>• IT Outsourcing<br>• Project and Program Management<br>• HR Outsourcing<br>• eLearning<br>• Fulfilment (SCM) |
| Increase Asset Efficiency ⇧<br>• Reduce Stock Levels<br>• Better Cash Management<br>• Better Debtor/Creditor Management<br>• Reduce Physical Assets<br>• Fixed Asset Optimisation | • Supply Chain Value Assessment (SCVA)<br>• Supplier Managed Procurement<br>• eProcurement<br>• B2B Marketplaces and eMarkets<br>• eFinance<br>• Back Office Performance |

Industry Analysis

- Value Levers Could Be:
- Labour Costs
- IT Costs
  HR Costs

PUBLIC SECTOR VALUE MODEL

RELATED APPLICATION

Under 35 USC §119(e)(1), this application claims the benefit of prior U.S. provisional application 60/426,503, filed Nov. 15, 2002.

TECHNICAL FIELD

This invention relates to a public sector value model.

BACKGROUND

A private sector organization typically produces outputs, such as products and/or services, using resources such as capital. For example, an automobile manufacturer produces automobiles using invested capital represented by share capital and debt. A shareholder value model is a traditional means of evaluating the performance of the organization. The shareholder model approximates the value of the organization by evaluating two components of shareholder value: (1) the ability of the organization to generate a return over and above that required by its shareholders and (2) the extent to which the organization can grow the amount of the investment.

SUMMARY

The present invention provides methods and apparatus, including computer program products, for evaluating public sector organizations.

In one aspect of the invention, a technique is disclosed that includes producing a public sector value of a public sector organization. The technique includes identifying at least one outcome measure and at least one cost-effectiveness measure for a public sector organization, obtaining measurements associated with the measure, and determining a relative public performance measure of the public sector organization based on the measurements.

In another aspect of the invention, a computer system includes a database for maintaining data associated with at least one public sector organization that includes at least one outcome measure and at least one cost-effectiveness measure; and a computer coupled to the database. The computer includes a processor and a memory, the memory configured to identify at least one outcome measure and at least one cost-effectiveness measure for a public sector organization, to obtain measurements associated with measures, and to determine a relative performance measure of the public sector organization based on the measurements.

In another aspect of the invention, a computer program product is tangibly embodied in an information carrier and is operable to cause data processing apparatus to identify at least one outcome measure and at least one cost-effectiveness measure for a public sector organization; obtain measurements associated with the measure; and determine a relative public performance measure of the public sector organization based on the measurements.

Embodiments of these aspects of the invention may include one or more of the following features.

The measurements are obtained from public data sources, for example, data from the organization. The relative public performance measure is compared with performance trends. Recommendations to the organization are made on the basis of the comparison. A cost-effectiveness measure is based on a ratio of at least one value of an outcome measure over a combination of annual expenditure and capital charge. Exogenous factors associated with an outcome measure are excluded. At least one of the outcome measures is weighed relative to another outcome measure of the public sector organization.

The public sector organization includes at least one of: public health, revenue service, educational, police, courts, probation, fire, public transport, prisons, customs, immigration, postal services, regulatory bodies, public housing, defense, social security, customs, and public welfare.

For example, with a police organization, an outcome measure includes at least one of: public satisfaction with the police organization, reduction of crime, solving a crimes, and public served. The cost-effectiveness measure includes at least one of: reduction of variable cost, reduction of fixed cost, increase in asset efficiency.

With a public health organization, an outcome measure includes at least one of: improved health care, reduced errors in prescriptions. In this example, the cost-effectiveness measure includes at least one of: reduction of variable cost, reduction of fixed cost, increase in asset efficiency. With a revenue service organization, an outcome measure includes at least one of: improved tax compliance, citizen satisfaction; and the cost-effectiveness measure includes at least one of: reduction of variable cost, reduction of fixed cost, increase in asset efficiency.

The inventions further include providing a recommendation to the public sector organization that includes at least one proposed solution to improve the relative performance measure of the public sector organization. A recommendation can be provided to the public sector organization that includes at least one consulting service to improve the relative performance measure of the public sector organization. Determining a relative performance measure can include evaluating the performance of the public sector organization as a function of time. A proposed solution for improving the relative performance measure can be derived on the basis of evaluating the performance of the public sector organization as a function of time. Alternatively, or additionally, a relative performance measure can be determined by evaluating the performance of the public sector organization by comparing one public sector organization having one relative performance measure to another public sector organization having another relative performance measure. Alternatively, or additionally, a proposed solution for improving a relative performance measure can be derived on the basis of comparing one public sector organization having one relative performance measure to another public sector organization having another relative performance measure.

The relative performance measure can be used to perform a correlation analysis between the relative performance measure and a particular outcome measure or a particular cost-effectiveness measure.

The techniques and systems disclosed above may provide one or more of the following advantages. The public sector value (based on the Public Sector Value model) may be used for valuation, comparison, diagnosing, and understanding value drivers within the organizations examined. The analysis of value drivers may be driven by the performance of the organization in terms of meeting outcome targets and levels of cost-effectiveness. The techniques may allow further diagnosis to be undertaken. For example, an organization at one point in the model may find that it needs to concentrate on improving cost effectiveness, whereas an organization at another point may need to concentrate on improving outcomes. The approach to improving performance may vary for each organization. An organization that is not cost effective but produces a high level of outcomes may have its budget reduced and measures taken to improve cost effectiveness. On the other hand, an organization with low outcomes, but which is relatively cost effective may actually be given more funds to improve the level of outcomes generated.

Through the use of detailed research and value trees, the above techniques may allow an organization to ascertain what specific actions the organization needs to take in order to create greater value. When these actions are identified, it may become clear what services and offerings the organization may require to help create greater value.

A public sector organization using the model according to the present invention may enable the organization to measure and compare performance based on value (e.g. between business units, and internationally), and guide performance improvement in areas such as target setting, performance assessment, and resource allocation.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 15A-15F are diagrams of a public sector value model of public sector organizations according to an implementation of the invention.

Like reference symbols in the various drawings indicate like elements.

DETAILED DESCRIPTION

Figure 1:
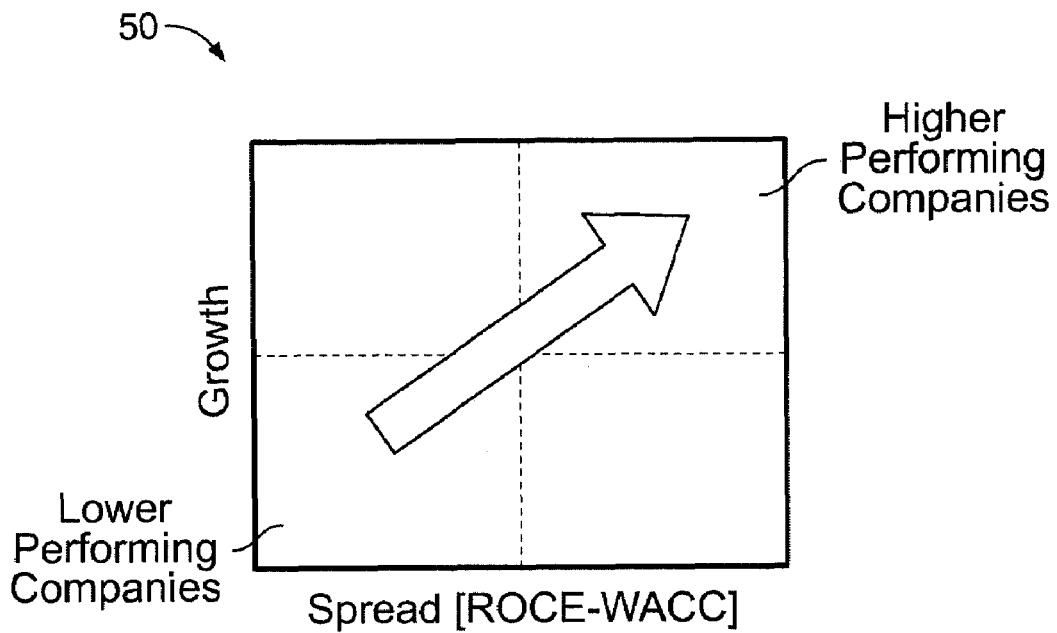
FIG. 1 is a diagram of a shareholder model for a private sector organization.
Figure 2:
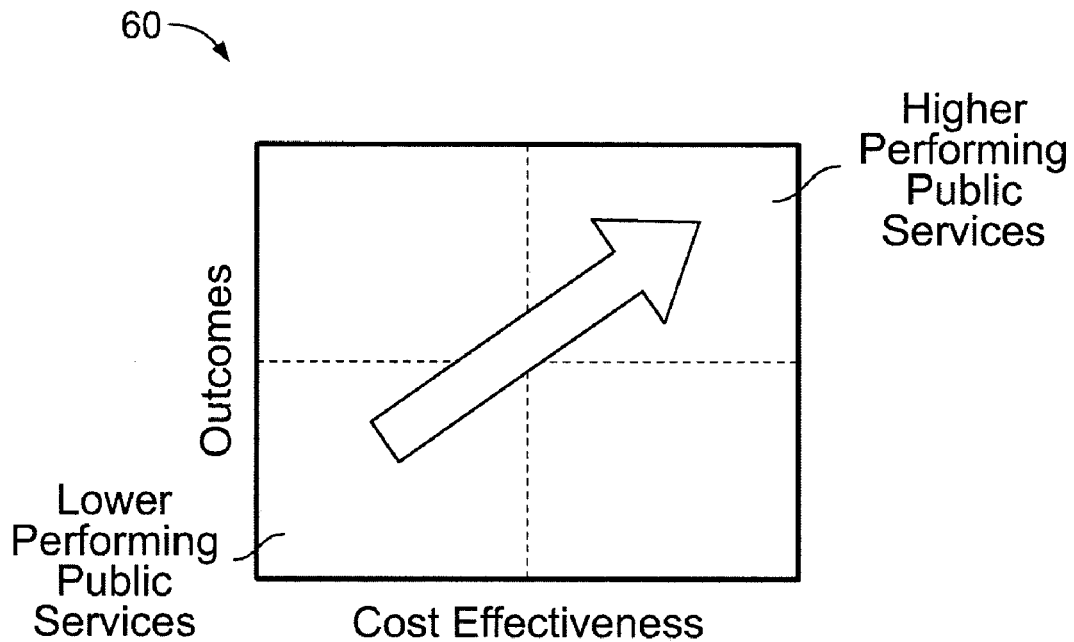
FIG. 2 is a diagram of a public sector value model according to an implementation of the invention.

Referring to FIGS. 1 and 2, diagrams of a shareholder model for a private sector organization and for a public sector organization are shown. The shareholder value model 50 represents a means of approximating the true value of commercial organizations. Commercial organizations exist in order to create value for their shareholders. This is the basis for the shareholder value model 50. It should be noted that although the true value of a commercial organization may have a strong bearing on its actual value (i.e. share price), it does not necessarily follow, since a variety of factors might affect a commercial organization's share price in a manner which may cause a deviation from true value (such as overly optimistic or pessimistic expectations of future performance).

As a context for developing a public sector value (PSV) model 60, a commercial sector organization has some distinct advantages over that of the public sector which make valuation easier to apply.

First, value is a readily identifiable starting point for commercial considerations. The commercial model can start from a consideration of what factors affect the basic measure of value—share price. The fact that a measure of value already exists for shareholders suggests that private sector value can be both understood and ultimately tested. The axes of the private sector model are the two key levers of shareholder value—the ability of the organization to generate a return over and above that required by its shareholders and the extent to which the organization can grow the absolute size of the investment. It should be noted that the value provided to other private sector stakeholder groups (such as employees) is actually more difficult to measure and in fact far more akin to the public sector in terms of a poorly defined understanding of value.

Second, the shareholder value model 50 may provide an advantage over any public sector equivalent because its core currency of value is in the form of money. The commercial sector can specify inputs and outputs all in terms of monetary value and consequently the issues of comparability which plague any public sector model are avoided. Examples include public sector outcomes such as improved health or reduced levels of crime, which do not have inherent and obvious financial values.

However, despite these differences, the shareholder value model 50 represents a useful starting position for developing a PSV model 60. The shareholder value model 50 suggests that anything that affects the true value of an organization to its owners will be reflected on one of the axes. Therefore, it must be the case that the axes in the PSV model 60 reflect all public sector value. It may not be possible to suggest an organization that is delivering value to the public in a way that is not reflected within the model.

The shareholder value model 50 measures the value of commercial organizations in terms of value to owners. This is not the only way of understanding value. Value, even in a commercial context, can be measured from the point of view of other stakeholders, such as employees, suppliers, customers or communities in which organizations are based.

Outcome vs. Outputs

The achievements of public sector organizations may be understood in terms of outcomes of social benefit. That the end result of the activity of a public sector organization is beneficial to some group of society who deserve that outcome is a justification for that public sector organization. Thus, socially beneficial outcomes can be used as measure of the value of public sector organizations.

There is a distinction between outcomes and outputs—a distinction familiar within the realm of performance measurement. Outcomes in this context are the achievements of organizations in terms of affecting pre-existing social realities. Outputs, however, are the end result of organizational processes. For example, an output of a police organization might include an arrest. An outcome of the police organization (and indeed an outcome of this particular output) might be the avoidance of criminal activities that would have been carried out by the arrested individual.

Outcomes can be used as a direct lever of public sector value, whereas outputs are only valuable in as much as they deliver outcomes. An organization might be very good at delivering outputs that are of no consequence in terms of any outcome. This would not represent public sector value. Therefore, the PSV model 60 seeks to measure outcomes rather than outputs.

Changes in total outcomes may be associated with the shareholder value model 50 in terms of growth in revenue. However, a shareholder may be interested only in the growth of revenue after they become a shareholder (as this increases the value of their investment—assuming spread remains constant). However, in the public sector, growth is not as significant a lever of value as total level of outcomes generated. Citizens may be interested primarily in the level of service provided, and not specifically in whether there has been an increase. For example, a police force which has consistently provided a very high level of service is of equal value to one which has matched its performance through spectacular growth (even though management in the latter might be said to have achieved a more significant task).

Measurement of the change to social outcomes is to some extent a practice already familiar within the public sector. To some extent, government performance is seen to be related to the levels of key outcome indicators for public services (such as levels of crime or education).

The measurement process includes the task of separating outcomes from outputs such that only outcomes are being measured. To apply this principle to any government industry requires the identification of the outcomes of that industry. This process can be performed through background research as well as consultation with experts and practitioners.

One approach for defining outcomes is to begin with a consideration of the very high level goals of any public sector organization. This is termed 'first level outcomes'. In some cases this will be a list of three or four. In the case of the public health, for example, it would include prevention of ill health and the correction of ill health through treatment.

In addition to these outcomes, the application of the PSV model 60 should also include a "Meeting Public Expectations" first level outcome. This outcome would be in addition to any others identified and would encompass all measures of service provision which are ultimately valued by the public, whether or not they are in fact core to the organization's fundamental goals.

It may also be necessary to make an analysis of any outcomes, which are a consequence of the organization's operation, whether beneficial or otherwise. Such outcomes may need to be taken into account when determining the total outcome of an organization's operation and in some cases may need to be negatively weighted such that their occurrence causes a reduction in the value of the organization. For example, such an outcome may include interference with free trade generated through port controls.

Having identified these first level outcomes, there can be a translation into lower level outcomes which together aggregate to the first level outcomes described. In the case of the correction of ill health, this list would include increased 'health' through surgical work and increased 'health' through medicine. Further breaking down of outcomes may be required until the point at which they can be effectively measured and weighted. However, the PSV model 60 is focused on outcomes and not outputs. It should be noted that the measure of health might still need to be defined. For example, in public health context, this would likely be by the commonly used QUALY (quality adjusted life year).

It might then be necessary to sub-divide first or second level outcomes down even further. The key-determining factor in producing this analysis is the need to measure performance of an outcome. (See block 104 in FIG. 2) In some cases only a small amount of breakdown might be required. In other cases much more complex outcomes might be measured only through 4 or 5 levels of outcomes.

To apply such a valuation model as a performance measurement tool within public sector organizations, it may be possible to define new measures of outcomes. However, it is more likely current and publicly available data will be used to conduct the analysis. In many cases, this data will be available only for outputs and in such cases this will mean using output measures as proxy indicators of the actual outcome.

To use output data in this manner, outputs should be applied to (and weighted within) outcomes, as they are understood to deliver that particular outcome. Although not ideal, this approach should allow judgments relating to value to be made in cases where outcomes simply are not measured. However, when doing this analysis, use of output measures as proxies for outcomes should be clearly stated. This is important, as later value level analysis will be limited in specific areas by the fact that outputs have been used to measure delivery of outcomes during the analysis.

In some cases, there may be some outcomes in any analysis, which cannot be successfully measured, even through the use of proxy output measures. In such circumstances, there are three choices, both of which should probably be used to produce alternative analyses. First, the model can ignore the areas, which cannot be measured. This may not be ideal. Second, the model can give organizations within the comparison equal performance within the outcome. This is preferable to giving all organizations no value in an outcome and such a practice would distort any overall analysis of value towards that which could be measured (something which is a common problem amongst public sector services). Lastly, organizations may be producing a particular outcome based on the level of funds spent on that area (as provided by the cost analysis within the model). This will only be possible where some sort of activity-based costing is available and will not always be appropriate, but it avoids the difficulty of scoring all organizations equally when some might be legitimately more focused on providing value in that area. A main problem is that expenditure is not a measure of outcomes Accurate measurement of outcomes can be improved by excluding exogenous factors which might affect outcomes quite significantly, but which are not in any way the responsibility of a public sector organization. Exogenous factors may vary depending upon the services being provided. For example, in social services, this may include local levels of unemployment, drug abuse or incidence of English as the first language.

Exogenous factors may have a significant impact on the levels of some outcomes, and in some cases this might even have a greater impact than the public service organization being measured. Given such circumstances, removing the impact of exogenous factors may be important in understanding actual performance. There may be two solutions to deal with this issue. First, through analysis and expert/practitioner input, an understanding of the relationship between key socio-economic factors and the outcomes selected could be understood and these could therefore be taken into account in developing a final performance score for each outcome. Second, by grouping organizations together based on common socio-economic factors, it may be possible (through making an assumption that all groups would, on the whole, perform at about the same level) to produce a baseline for each group and thereby exclude exogenous factors.

A requirement for being able to weight outcomes includes normalizing the scale on which they are measured. For example, in certain implementations, where a particular outcome is measured 'by household' and another is measured 'per population', the data might be normalized so as a fair comparison can be made. Once accurate measures of outcomes have been calculated, it may be necessary to articulate the relative significance of each outcome. This may be important to produce a single comparable outcome score. Thus, weightings may have to be applied to performance in achieving each outcome such that, for example, it is possible to compare the value of a particular burglary rate, with the value of a particular murder rate. Possible techniques for performing such a weighting system may include, for example, surveying the public, examining the social and/or economic cost of each outcome or asking government industries to indicate their preference, or other techniques.

One approach would include initially conducting an analysis of work done in this area. In particular, this would focus on examining academic work on economic and social cost—which is used widely within central government. Having conducted this analysis, it would then be necessary to apply some judgment and consult widely with experts and practitioners before finalizing the weightings.

Thus, the PSV model 60 is based on outcomes delivered as a driver of public value. In addition, the PSV model 60 includes another measure based on the private sector model—return on the investment.

The PSV model can be applied to public sector organizations such as public health, revenue service, educational, police, fire, defense, public welfare or other organizations. For example, in the police organization context, an outcome can include public satisfaction with the police organization, reduction of crime, solving crimes, public served; whereas cost-effectiveness can include reduction of variable cost, reduction of fixed cost, and increase in asset efficiency. In a public health organization context, an outcome can include improved health care, reduced errors in prescriptions; whereas cost-effectiveness can include reduction of variable cost, reduction of fixed cost, and increase in asset efficiency. Similarly, in a revenue service organization context, an outcome can include improved tax compliance and citizen satisfaction; whereas cost-effectiveness can include reduction of variable cost, reduction of fixed cost, and increase in asset efficiency.

Outcome Model Methodology

Selection of the correct outcomes is important to the effective construction of a PSV analysis. To derive the appropriate outcomes for a government agency, the value of the agency needs to be considered from two perspectives:

What is the purpose of the agency—its reason for being?

What are citizens' expectations of the agency as it delivers services?

Figure 3:
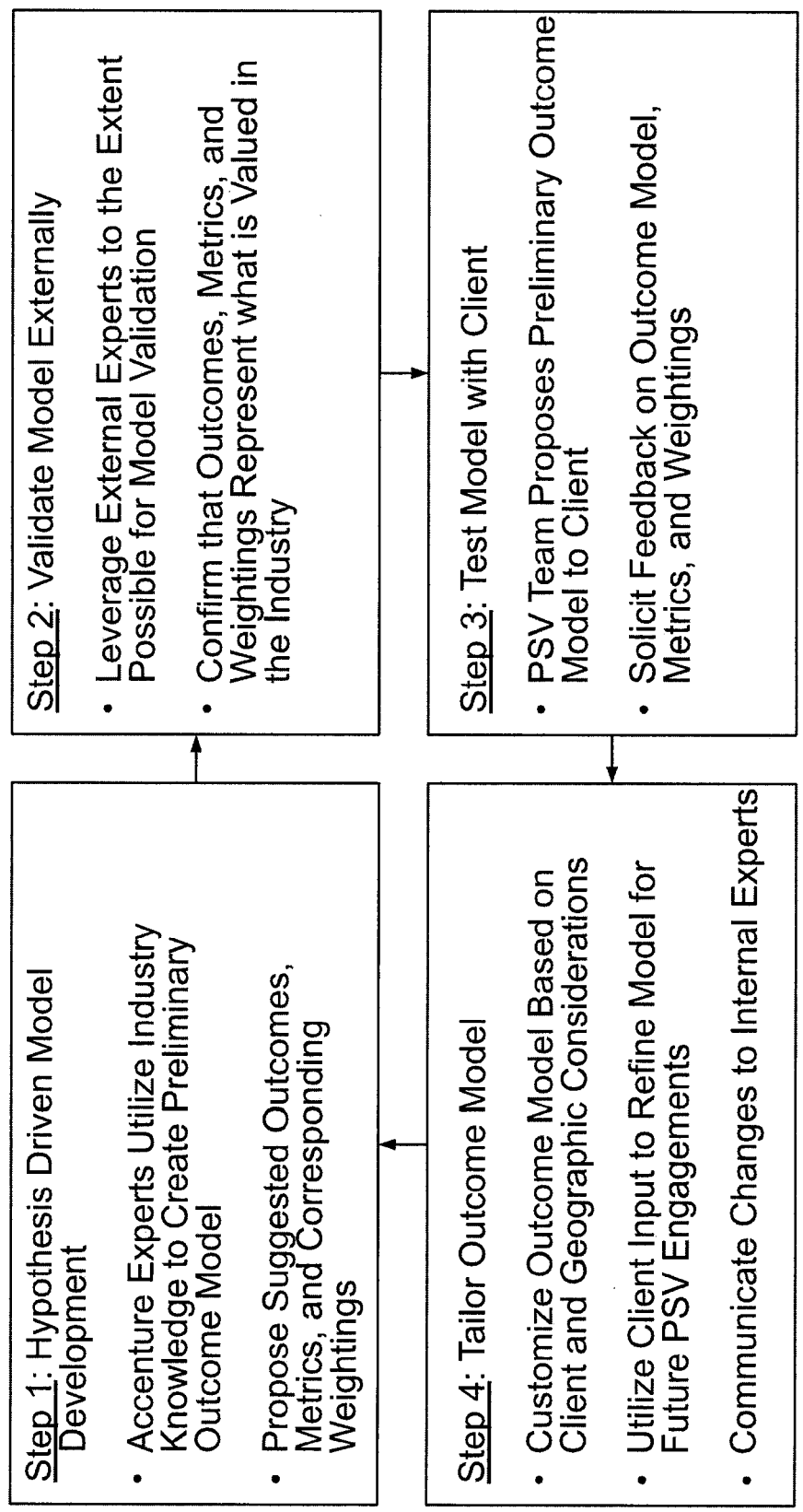
FIG. 3 illustrates a methodology for developing an outcome model.

Referring to FIG. 3, a recommended approach for identifying outcomes for a public sector organization is to follow a four step iterative process. In step (1), industry experts are consulted to develop hypotheses of industry outcomes. The experts use industry knowledge to create a preliminary model and can propose suggested outcomes, metrics, and corresponding weightings. In step (2) the outcomes are tested with an appropriate industry organization. For example, to the extent possible, external experts are leveraged for model validation. The outcomes, metrics, and weightings representing what is valued in the industry are confirmed. In step (3) the outcomes are tested with the client. In particular, a Public Sector Value team can propose preliminary outcome model to client and solicit feedback on the outcome model, metrics, and weightings. In step (4) the original outcomes are refined based on the feedback. For example, the outcome models can be customized based on client and geographic considerations. The client's input can also be used to refine model for future PSV engagements. The changes are then communicated to internal experts.

To start the outcome identification process, a synthesis of publicly available information such as an organization's targets and performance objectives (PSAs in the UK), annual reports, national statistical agencies, academic research publications will provide a baseline.

As illustrated from the iterative approach shown in FIG. 3, the process undertaken whereby outcomes are selected will depend upon whether the prospective client is involved or not. Ideally outcome selection is performed in conjunction with senior client personnel. Where this is not possible any of these methods can be employed:

Consulting industry experts.

Analysing organisation targets and performance objectives

Annual reports, national statistical agencies, academic research publications

Discussion with senior client personnel.

Different stakeholders value different outcomes as they have differing priorities which can also change over a period of time due to political pressures and media influence. For instance a revenue agency may choose at different times to focus more upon maximising revenue than on providing a service for the customer depending upon the political mandate. It is important to concentrate on the purpose for the organisations existence and its objectives. For example an objective of an education establishment would be to maximise the education of the students.

There is no fixed number of outcomes which should be selected although the outcomes chosen should focus on the core function of that agency. Therefore an outcome which measured only a very small percentage of that organisation's activity would not be appropriate. However, more than 6 or 7 outcomes may prove to be unwieldy whilst less than 3 or 4 may be misleading.

There may not be sufficient data available for a particular outcome/outcome metric to produce a score. In this situation, the outcome should still be included but the weighting (explained in detail further) should be set to zero. If relevant data in the future becomes available to measure the outcome, perhaps through a change in the organisation's performance measurement system, a weighting would be applied to the outcome.

It is possible that the outcomes selected may not always match the measurements by which the organization is currently evaluated. In this way PSV can demonstrate to senior client personnel an alternative perspective as to the performance of the organization.

The PSV model 60 can be used to measure and graphically represent the value created or destroyed by a public sector organization. The PSV model 60 measures value along two dimensions: "Outcomes" and "Cost effectiveness" and is constructed to compare either one or a group of organizations' performance over time.

The PSV model 60 allows multiple organizations to be compared across multiple time periods. For many applications, the comparison of organizations may only be valid if these organizations are in a similar industry and have relatively similar attributes and functions. The PSV model 60 can also be used to compare one or more organizations outcome scores and its Cost Effectiveness scores.

Figure 4:
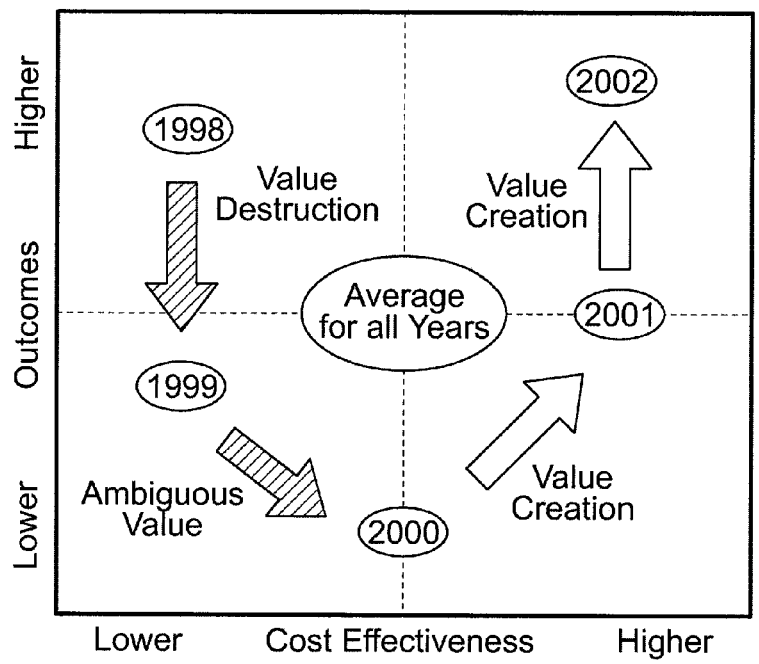
FIG. 4 is graph showing an organization's performance over time in comparison to an overall average performance.

Referring to FIG. 4, a PSV matrix 100 illustrates how an organization has performed over a period of years in comparison to its overall average performance or against the average organizations performance.

The plot of an organization on the PSV matrix measures the organizations performance in particular whether the most recent years indicate an organization is outperforming/underperforming its outcomes or outperforming/underperforming its cost effectiveness over the time period of the analysis. It is important to note that the matrix represents an organizations performance relative to the average and not whether an absolute high level of achievement or a poor level of achievement has been obtained.

PSV is an effective tool for determining whether an organization's policies are having the desired effect in improving outcome performance or/as well as improving the cost effectiveness of the organization over a period of time, or benchmarked against other organizations.

Interpreting a PSV Matrix and Graph

A public sector organization's position on a PSV matrix determines one of the following:

How the organization has performed over a period of time against the average

How the organization's performance has changed from one year to the next

How the organization has performed against on average alongside all organizations compared The average score (i.e., the point where the Outcome score and Cost Effectiveness axes intersect) represents the average outcome and cost effectiveness score for the data selected. Therefore any data which does not lie on the average will either have a higher/lower outcome score than the average or a higher/lower cost effectiveness score than the average.

Figure 5:
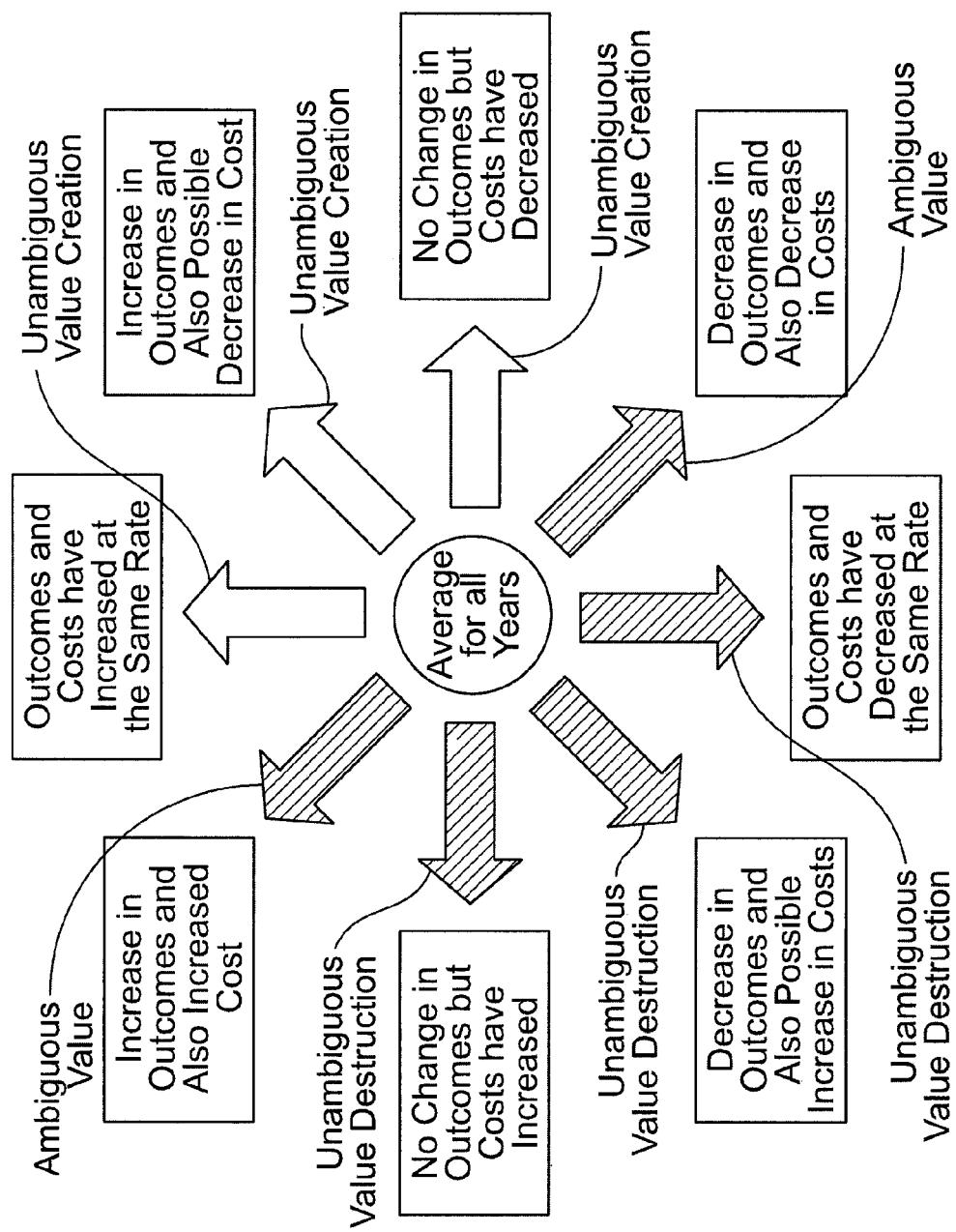
FIG. 5 is compass representation illustrating various outcome and cost effectiveness vectors.

For example, referring to FIG. 5, a compass representation 200 illustrates the various outcome and cost effectiveness vectors.

Vector 202 (Movement to the North East) Where an organization's score for a particular year or against the benchmark lies to the north east of the average score, the organization has created value relative to its average performance (measured by increasing its outcomes and cost effectiveness). This is due to an increase in outcomes and a possible decrease in cost. Further investigation needs to be conducted, through analysis of the data to establish whether organizations costs have decreased. This is the most desirable area relative to the average score.

Vector 204 (Movement to the North) Where an organization's score for a particular year or against the benchmark lies to the north of the average score, the organization has a greater outcome score relative to the average score but the same cost effectiveness score. Remembering that cost effectiveness is equal to Outcomes/Cost, this therefore means that cost has increased in direct proportion to the overall outcomes.

Vector 206 (Movement to the North West) Where an organization's score for a particular year or against the benchmark lies to the north west of the average score, the organization has a greater outcome score relative to the average score but a lower cost effectiveness score. Remembering that cost effectiveness is equal to Outcomes/Cost, this therefore means that cost has increased at a greater rate than the increase in outcomes relative to the average Vector 208 (Movement to the West) Where an organization's score for a particular year or against the benchmark lies to the west of the average score, the organization has the same outcome score relative to the average score but a lower cost effectiveness score. Remembering that cost effectiveness is equal to Outcomes/Cost, this therefore means that cost is greater than that of the average cost for that data point.

Vector 210 (Movement to the South West) Where an organization's score for a particular year or against the benchmark lies to the south west of the average score, the organization has a lower outcome score relative to the average score and a lower cost effectiveness score relative to the average. Further investigation needs to be conducted to establish whether an organization's costs have increased through analysis of the data. This is the least desirable area of the matrix relative to the average score.

Vector 212 (Movement to the South) Where an organization's score for a particular year or against the benchmark lies to the south of the average score, the organization has a lower outcome score relative to the average score but the same cost effectiveness score. Remembering that cost effectiveness is equal to Outcomes/Cost, this therefore means that cost has decreased in direct proportion to the overall outcomes decrease.

Vector 214 (Movement to the South East) Where an organization's score for a particular year or against the benchmark lies to the south east of the average score, the organization has a lower outcome score relative to the average score and a greater cost effectiveness score relative to the average. Remembering that cost effectiveness is equal to Outcomes/Cost, this therefore means that cost has decreased at a greater proportion than the outcomes decrease.

Vector 216 (Movement to the East) Where an organization's score for a particular year or against the benchmark lies to the east of the average score, the organization has the same outcome score relative to the average score but a greater cost effectiveness score than the average. Remembering that cost effectiveness is equal to Outcomes/Cost, this therefore means that cost is less than that of the average cost for that data point.

It is important to appreciate that these scores are not absolute scores but are relative to the average score. Therefore, it is not possible to say that any point on the matrix represents poor/good performance in absolute terms. However, it is possible to say that relative to the average an organization has outperformed or underperformed in a particular year. It is also possible to plot a trend line determining whether an organizations performance is improving or is deteriorating year on year.

In addition, it is important to note that the concept of the moving average applies to this analysis. Therefore a PSV analysis covering 5 years or 5 organizations would present a different average to a PSV analysis covering 10 years of 10 organizations. In this respect, if an organization were consistently producing increasing outcome scores and cost effectiveness scores the average would be constantly moving towards a northeasterly direction. The moving average can be monitored to see if there is an overall trend in averages. The moving average can be monitored to see if there is an overall trend in averages.

These vectors can be super imposed upon any PSV matrix to explain the meaning of each data point and whether it represents an improvement or decline in outcomes and cost effectiveness.

Graphical Representation of Outcomes and Cost Effectiveness

Once the outcomes and cost effectiveness have been calculated the results can be presented through a series of graphical plots. The graphical plots show relative scores, rather than absolute scores. Thus, the scores can be used to benchmark, to rank and prioritise, to identify patterns and trends, and to compare against average performance over time and other organizations.

Figure 6:
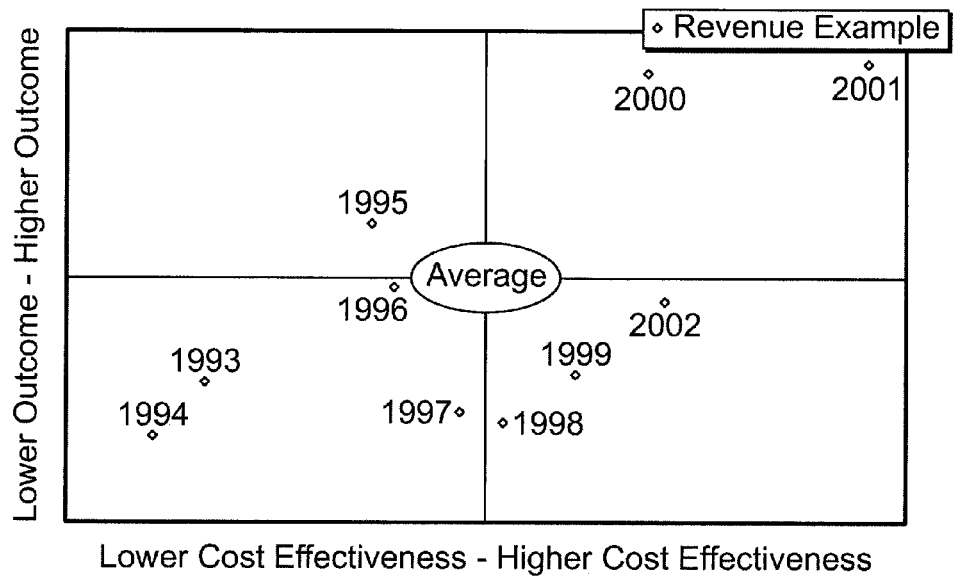
FIG. 6 is graph showing both outcome and cost effectiveness for a time series/single organization matrix.

Referring to FIG. 6, a revenue example shows both the Outcome and the Cost Effectiveness scores for a Time Series/Single Organization matrix. The matrix demonstrates two measurements of performance alongside each other.

FIG. 6 represents the organizations performance over both Outcomes and Cost Effectiveness relative to the average and as such represents an effective method of assessing an organizations performance over a period of time. This example matrix shows that 2001 was the highest performing year for that organization as it was the year that the cost effectiveness and Outcome score were furthest above the average. In 1995 the Outcomes were above average but the Cost Effectiveness score was below average. In 1993 and 1994 the Cost Effectiveness and the Outcome scores were above average.

Figure 7:
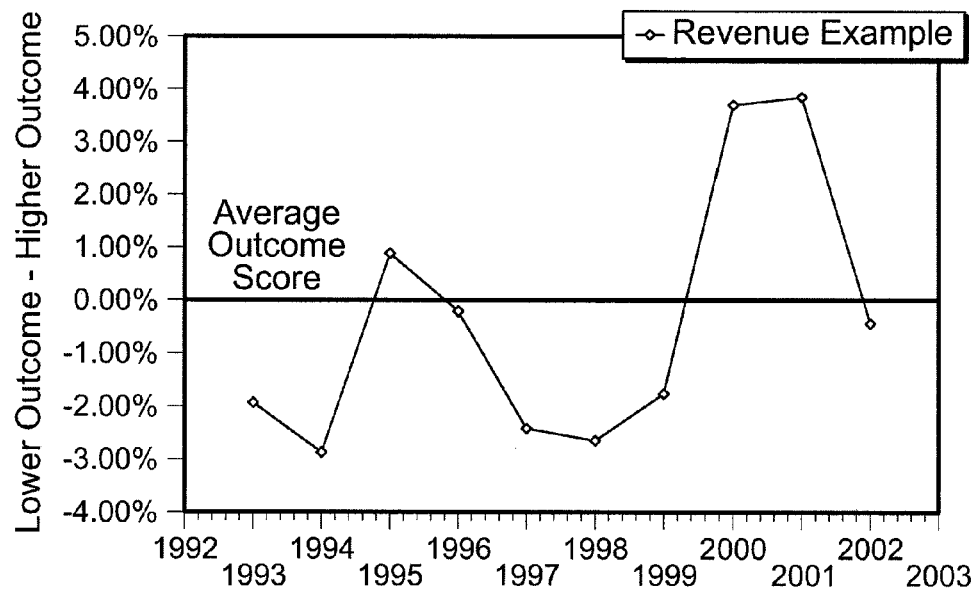
FIG. 7 is a graph showing the outcome performance alone, of the organization, over a period of time relative to its average score.

Referring to FIG. 7, the outcome performance alone, of the organization, over a period of time relative to its average score is shown. A score of 0% represents the average performance for all years. Therefore 1996 performed close to the average performance whilst 1994 underperformed the average score by 3%. The graph demonstrates that 2001 and 2001 was the highest performing year with 1997 and 1998 the lowest performing year.

Figure 8:
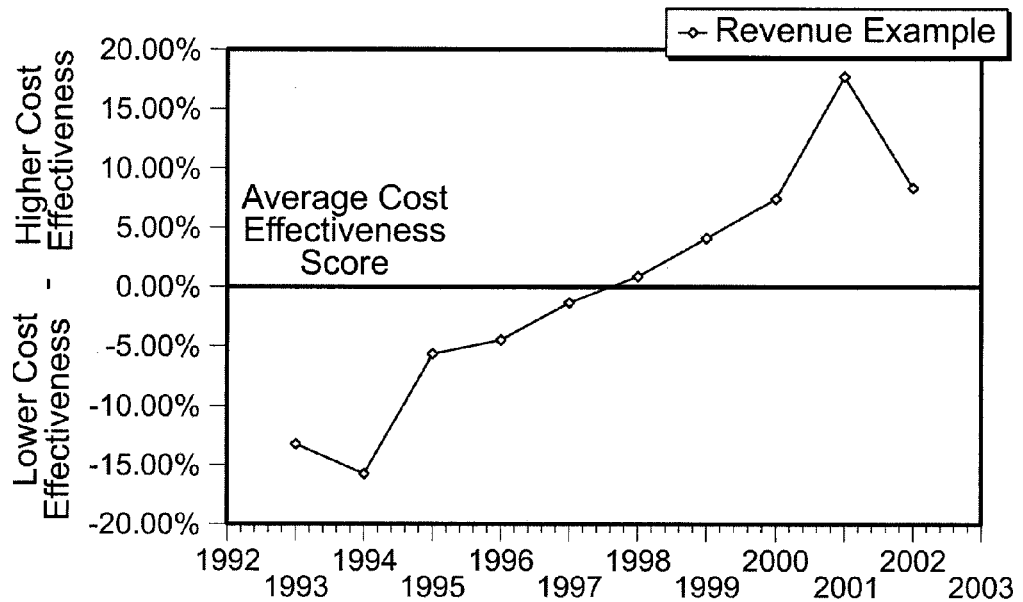
FIG. 8 is a graph showing an organization's cost effectiveness performance over a period of time relative to its average score.

Referring to FIG. 8, an organization's cost effectiveness performance over a period of time relative to its average score is shown. A score of 0% represents the average performance for all years. Therefore 1997 performed close to the average performance whilst 1994 underperformed the average score by 15%. The graph demonstrates that 2001 was the highest performing year outperforming the average by almost 20%. Overall the graph illustrates an improving cost effectiveness trend.

Figure 9:
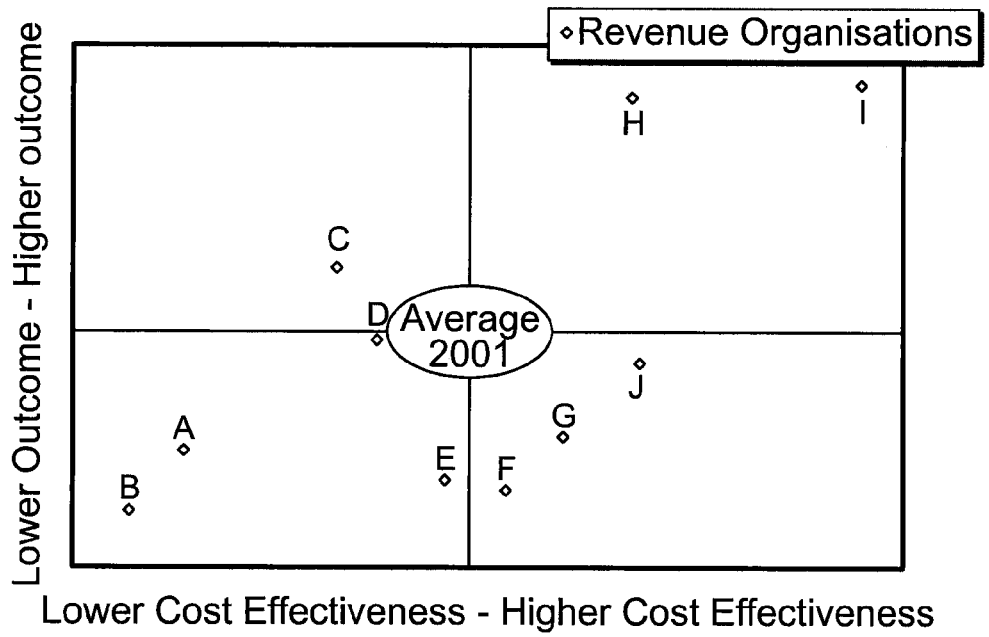
FIG. 9 is a graph showing an organization's outcomes and the cost effectiveness score relative to the average organizations performance within a particular year.

The revenue examples shown above in conjunction with FIGS. 9-14 show one organization's performance over multiple years. Other matrix analyses can benchmark multiple organizations performances within a particular year. For example, referring to FIG. 9, an organization's outcomes and the cost effectiveness score relative to the average organizations performance within a particular year is shown. It is important to appreciate that the matrix is not portrayed as a graph whereby the two axes are related to each other. Rather, the matrix demonstrates two performance measurements of the organizations selected. FIG. 9 shows that Organization I was the highest performing organization as it obtained the highest cost effectiveness and outcome score. In contrast particular attention should be given to organization A and B as both outcomes and cost effectiveness are well below the average.

Figure 10:
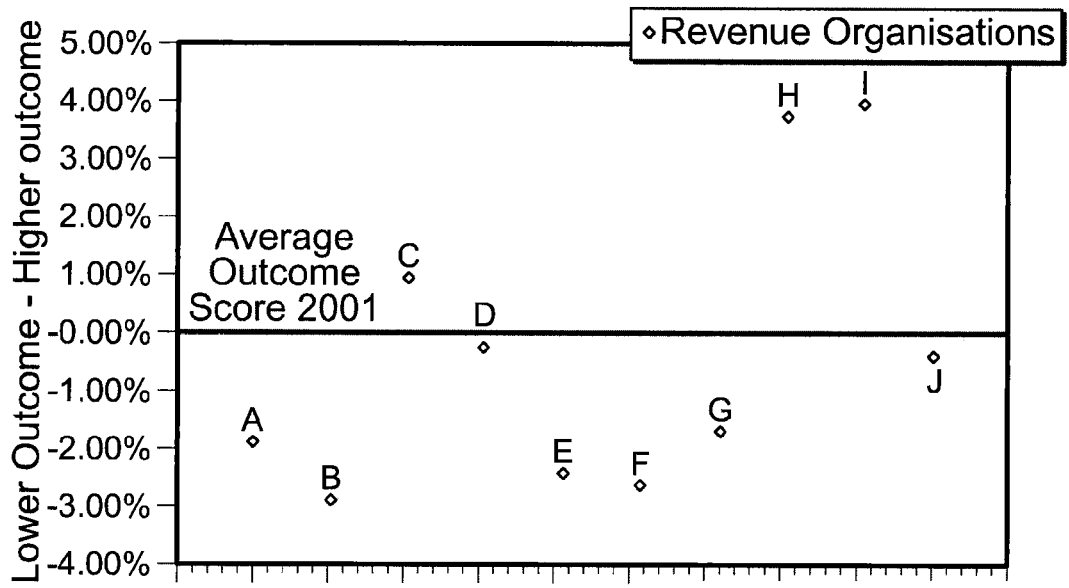
FIG. 10 is a graph showing the outcome performance for a number of organizations relative to the average organizations performance within a particular year.

Referring to FIG. 10, the outcome performance for a number of organizations is shown relative to the average organizations performance within a particular year. The graph demonstrates that organization I was the highest performing organization, outperforming the average by 4% whilst the lowest performance was organization's B underperforming the average by 3%.

Figure 11:
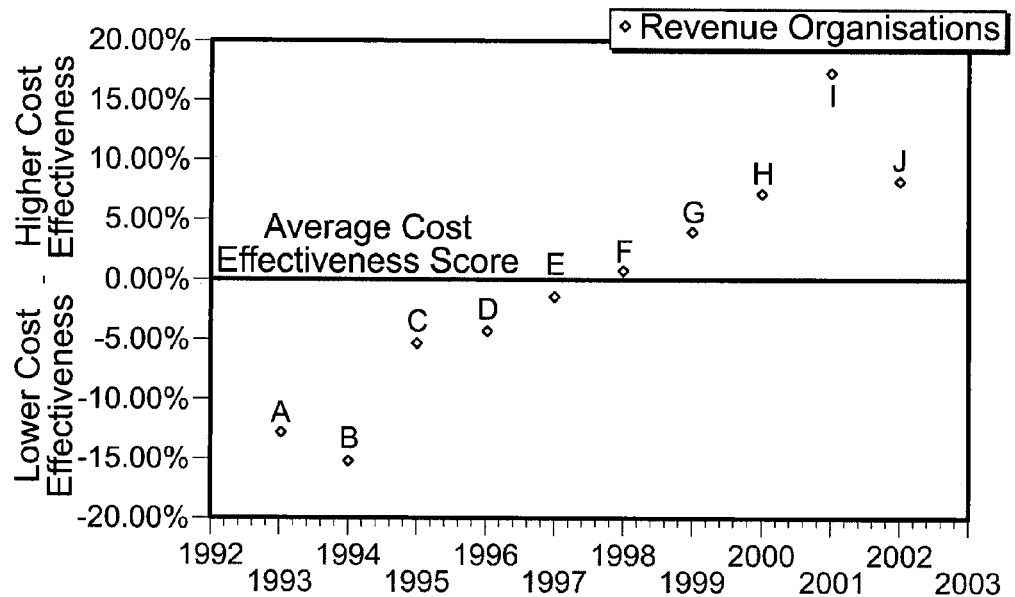
FIG. 11 is a graph showing, the cost effectiveness performance for a number of organizations relative to the average organizations performance within a particular year.

Referring to FIG. 11, the cost effectiveness performance for a number of organizations is shown relative to the average organizations performance within a particular year. The graph demonstrates that organization I was the most cost-effective organization, outperforming the average by 20% whilst the least cost-effective organization was organization's A and B underperforming the average around 15%.

Figure 12:
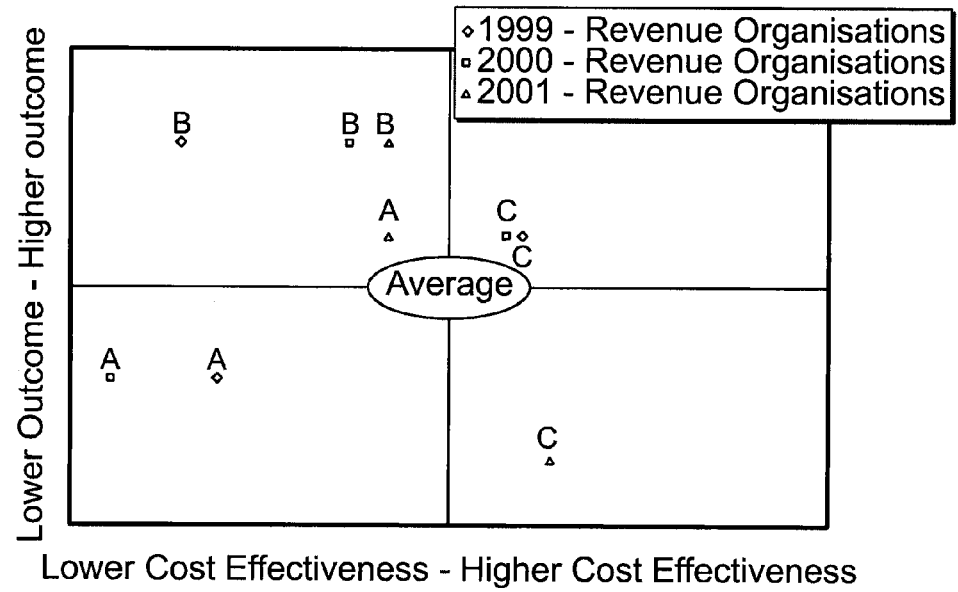
FIG. 12 is a graph showing the outcome and cost effectiveness performance for a number of organizations relative to the average organizations performance over multiple years, here three years.

Referring to FIG. 12, the outcome and cost effectiveness performance for a number of organizations is shown relative to the average organizations performance over multiple years, here three years.

This matrix demonstrates two measurements of performance of the organizations selected. In particular, the matrix represents the organizations performance over both outcomes and cost effectiveness relative to its average score over a number of years and as such represents an effective method of assessing an organizations performance in comparison to the average organizational performance over a period of time. This example matrix shows that Organization C in 1999 and 2000 was the highest performing organization as it obtained the highest cost effectiveness and outcome score. In contrast organization A for 1999 and 2000 underperformed the average in both measurements of performance, Outcome and Cost effectiveness.

Figure 13:
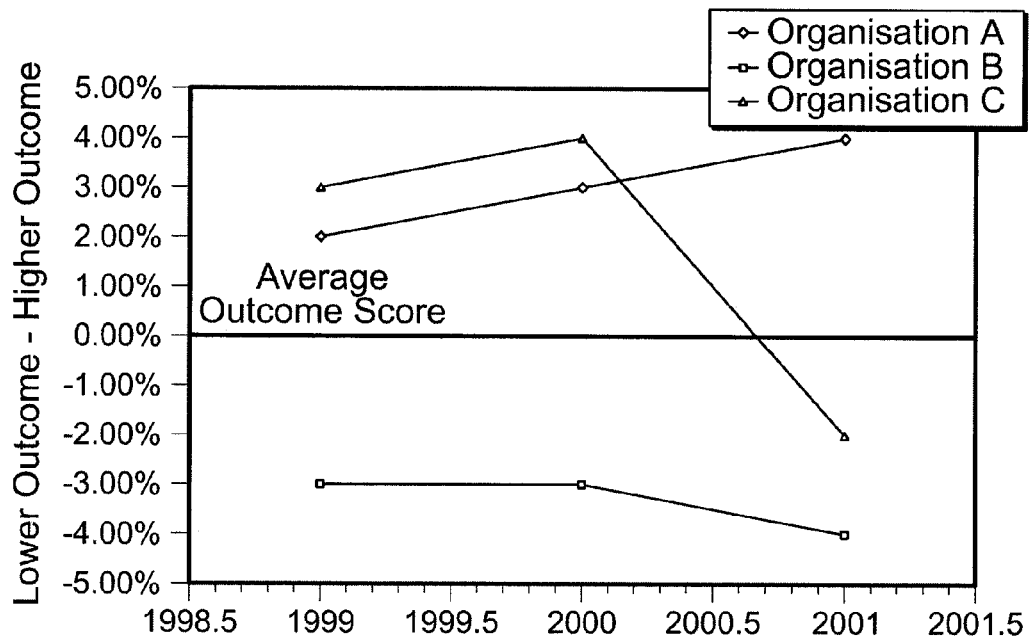
FIG. 13 is a graph showing the outcome performance for a number of organizations relative to the average organizations over a period of time relative to the average score.

Referring to FIG. 13, the outcome performance for a number of organizations is shown relative to the average organizations over a period of time relative to the average score. The graph shows that Organization A has improved its performance and has consistently outperformed the average. The highest performance was in 2001 when organization A outperformed the average by 4%. In contrast organization B performance has declined in comparison to the average year on year.

Figure 14:
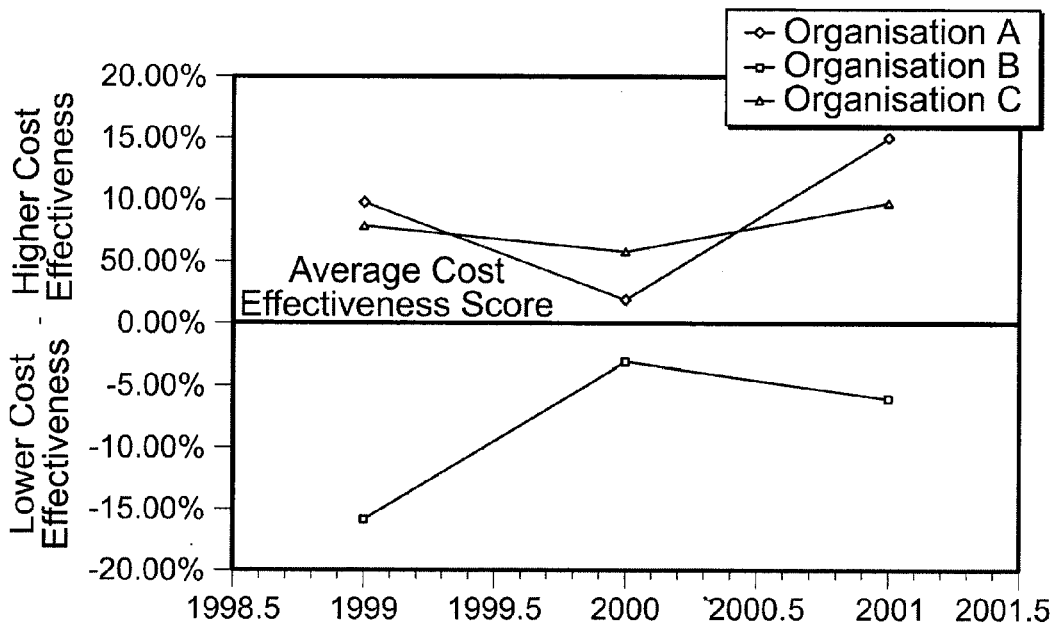
FIG. 14 is a graph showing the cost effectiveness performance for a number of organizations relative to the average organizations over a period of time relative to the average score.

Referring to FIG. 14, the cost effectiveness performance for a number of organizations is shown relative to the average organizations over a period of time relative to the average score. The graph shows that organization B in comparison to the average organizations performance has consistently underperformed by up to 15%. Organization A and C have consistently outperformed the average performance. The highest performance was Organization A in 2001, which outperformed the average by 15%.

Note that each graph and matrix has its own benefits and limitations. The matrix allows the categorisation of organizations in comparison to the average performance whilst individual graphs provide more detail as to an organizations performance.

The public who may benefit from public sector outcomes are also the taxpayers who fund them and users of other public services. The model of public sector value should consider the cost of achieving outcomes, both financial and in terms of the opportunity costs. It is of value to the public if the organization providing outcomes does so in a cost-effective manner. If there is another organization which might deliver similar outcomes but through the use of less resources, then the citizen would have a vested interest in using the latter organization, either to allow for the raising of less taxation or for the greater delivery of beneficial outcomes from the finite resources available. It should be noted that although not all of the public are taxpayers, they are all benefactors of monies raised through taxation and consequently. This may be true even if they are not personally funding any public sector organization they still have a vested interest in ensuring that money is spent effectively as this would negatively impact their capacity to benefit from that money.

Calculating Shareholder Value and Public Sector Value

The shareholder value model 50 includes a consideration of the risk involved in making an investment decision. A high-risk investment (i.e. one which has a lower probability of delivering a return to the investor) is represented in the model by deducting the Weighted Average Cost of Capital from the Return on Capital Employed to derive Spread. It may be argued that risk also exists in public sector investment decisions. For example, a government organization may traditionally deliver a varying level of return for the funds provided, and so is said to be more risky than a government industry for which, over time, the delivery of returns are more consistent. There is value inherent within this consistency. Given two government projects where the expected return was equal, the government and the public would be more likely to grant the funds to the project where the variance in return (i.e. risk) is lower.

Risk may be determined by a combination of organizational- and industry-specific factors. Two organizations within the same industry may differ in their respective risk levels due to management quality or organizational characteristics. In addition, two government industries, such as health and policing, may differ in risk due to factors inherent within the service they are providing.

The PSV model 60 is most likely to be applied in comparing business units within the same government industry. Therefore industry-specific factors become irrelevant. It can be assumed that within these government industries the degree of risk between each organization (e.g. different police forces) is likely to be marginal because each business unit is involved in the same sorts of activities and operates in a similar political and legislative environment. Furthermore, within the public sector organizations within the same industry (particularly within the same country) tend to be structured in a similar manner.

In addition, developing a mechanism for accurately measuring risk in the public sector may be difficult for several reasons. For example, it may be difficult to realistically measure past performance and past performance may not be a meaningful indicator of future risk. Therefore, risk may be ignored in the PSV model 60.

The PSV model 60 is based on outcomes and cost-effectiveness as the two key measures of public value. As shown, organizations that can, over time, move in a positive direction along either the horizontal or vertical axes can increase their value to the public. Ideally, organizations would be able to improve their performance on both axes and move in a Northeasterly direction, as indicated.

The PSV model 60 provides an approximation of value—which is an inherently more difficult concept to determine in the public sector context. However, the approximation of value may allow an understanding of the value levers in the public sector as a whole, in order to derive the levers of value within a specific government industry.

As a practical point, it may be important to enable the software used to calculate the value, to have weightings adjusted relatively easily. This may allow quick updating of weightings, which may be a contentious part of any analysis. It would also be important to view the impact of changing weightings. For example, it may provide an indication of whether services which are good in one area in fact good in all areas. In another example, it may show whether public value is significantly affected by priority, given different outcomes. This is a factor that can be addressed on an industry-by-industry basis through this model.

The PSV model 60 includes the use of outcomes and cost-effectiveness for delivering these outcomes as the two levers. These two levers represent an increase in the volume of benefits to society, at a lower cost to government, to drive overall public sector value. The derivation of an outcome driver was described above. The following describes the derivation of cost effectiveness as a driver.

In the shareholder value model (i.e. private sector context), the calculation used for Spread is:

$$\text{Spread} = \text{Return on Capital Employed}(ROCE) - \text{Weighted Average Cost of Capital}$$

Where ROCE is calculated thus:

$$ROCE = \frac{\text{Free Cash Flow}}{\text{Total Capital Employed}}$$

And where WACC is calculated thus:

$$WACC = \frac{D}{D+E} \times C_{debt} \times (1-t) + \frac{E}{D+E} \times C_{equity}$$

Where (in the above equation):

$$\frac{D}{D+E} = \text{Debt to equity ratio}$$

t=Tax rate
$C_{debt}$=Cost of debt (e.g. credit rating from Std & Poors)
$C_{equity}$=Capital Asset Pricing Model (reflects the risk or beta associated with investing in the particular sector)

The shareholder value model 50 measures Spread, which represents a measure of financial return. This gives the return to shareholders as a percentage of the capital invested. The point is to measure the return provided on the funds that the shareholder has put at risk by investing in the company. A shareholder is only asked to invest funds when they initially invest. Therefore, invested capital is represented by share capital and debt.

In the PSV model 60, the concepts of ROCE and WACC need to be developed, in line with the differences between private and public sector investment decisions.

ROCE is the return the investor would expect to receive, as a percentage of their initial investment. This measures how well an organization uses assets to generate profit. In the public sector, the return is outcomes. However, the PSV model 60 does not attempt to measure how well a public sector organization has used assets to generate profit. Outcomes represent the gross product of activity. Cost Effectiveness is calculated as the outcomes generated as a proportion of the resources consumed in producing these outcomes. This is a conceptually different ratio to ROCE, but one, which measures the effectiveness with which an organization uses the resources available to it.

Within public sector organizations additional funds are provided each year (Annual Expenditure). In addition, the asset base (e.g. property) remains within the organization, although the value of this asset base will vary over time. The organization needs to justify holding these assets, which could be used elsewhere within the public sector, including to pay-off public borrowing. In order to reflect this opportunity cost the cost of debt is used to produce a notional cost; the Annual Capital Charge. Therefore in order to represent the funds consumed by a public sector organization both annual expenditure and the capital charge must be included.

Cost Effectiveness is calculated as:

$$\text{Cost Effectiveness} = \frac{\text{Total Beneficial Outcomes}}{(\text{Annual Expenditure} - \text{Capital Expenditure}) + \text{Annual Capital Charge}}$$

Expenditure, also known as operating expenses, is defined as the annual operating costs (salary, rent, etc.) that are used to generate outcomes. This expenditure is normally available on a public sector organization's income statement.

The capital charge represents the opportunity cost of holding capital (property, equipment, cash reserves, etc.) which could be used elsewhere within the public sector. This opportunity cost is reflected by the following equation [(cost of capital) * (total assets−current liabilities)] where the cost of capital equals the cost of debt (government bond rate) and total assets minus current liabilities equals the organization's true level of assets.

In order for a PSV analysis to measure the organizations cost effectiveness accurately, the correct accounting treatments must have been applied to the organizations accounts to ensure that the expenditure and the capital charge is properly reflected within the selected year.

In addition, where a PSV analysis compares an organization over time or benchmarks organizations against each other, it is generally important that the same accounting standards have been applied to the organizations accounts in order to ensure fair comparisons.

Unfortunately different public sector organizations and countries have varying accounting standards which can negate the effective comparison of cost effectiveness unless action to standardize expenditure and the capital charge is implemented.

WACC is an important factor within the Shareholder Value model. Shareholders expect a certain level of return on their investment and the expectations of shareholders are largely driven by the perceived risk of the company in which they are investing. This is because investors must be given an incentive to invest in more risky operations through the prospect of greater returns than those available from less risky investments.

In order to gain funds equal to that of a less risky company, a more risky organization needs to promise a greater return on the investment—increasing its WACC. The Shareholder Value model reflects this use of risk within investor decision-making by adjusting the WACC on the basis of the beta value of companies.

When applied to the private sector, WACC is calculated, at a basic level, by analysing the ratio of debt (multiplied by the cost of debt and the effect of any tax benefits to the company) and equity (multiplied by the level of risk, referred to as beta, associated with investment in a particular market). For example telecommunications may be seen as a more risky investment than retail.

Within a given government, the cost of debt in the public sector is constant as this controlled by a treasury department (this reflects the cost of borrowing for the government as a whole). The model already reflects the cost of debt in the Annual Capital Charge. The remaining factor is the cost of equity, directly derived from the beta value i.e. the risk associated with investing in one particular area of government, over and above an alternative.

However, as discussed above, risk is not include in the public sector analysis, and in any case, the primary application of the model is in comparing business units within the same government industry where the impact of risk across business units is likely to be marginal.

Therefore, Cost Effectiveness is calculated thus:

$$\text{Cost Effectiveness} = \frac{\text{Total Beneficial Outcomes}}{(\text{Annual Expenditure} - \text{Capital Expenditure}) + \text{Annual Capital Charge}}$$

The PSV model 60 should address the issue of whether pension cost should be included in the model. For example, pension costs in a particular country may be considered to be non-controllable within the public sector, due in large part to their non-funded nature. This is part of the cost base that cannot be influenced by management and therefore should not be included in any assessment of performance or value added.

However, pension costs cannot be excluded without distorting the model. For example, it might distort any comparison between a capital intensive and labor-intensive organization (it would make the labor intensive appear more efficient than it actually is by reducing the relative cost of labor artificially). Therefore, a mechanism for including pension costs in an equitable way is required. This issue may require further assessment, but a percentage added to labor costs representing the actuarial pensions liability of employing current employees in the current year is the likely way forward.

Application of the Public Sector Model

Referring to FIGS. 15A to 15F, an example of the PSV model applied to particular public sector organizations, in this case, the police organization is described. It should be understood that the PSV model 60 might be applied to other public sector organizations such as public health, revenue service, educational, fire, defense, public welfare, or other organizations and other non-profit organizations.

Figures 1, 15A:
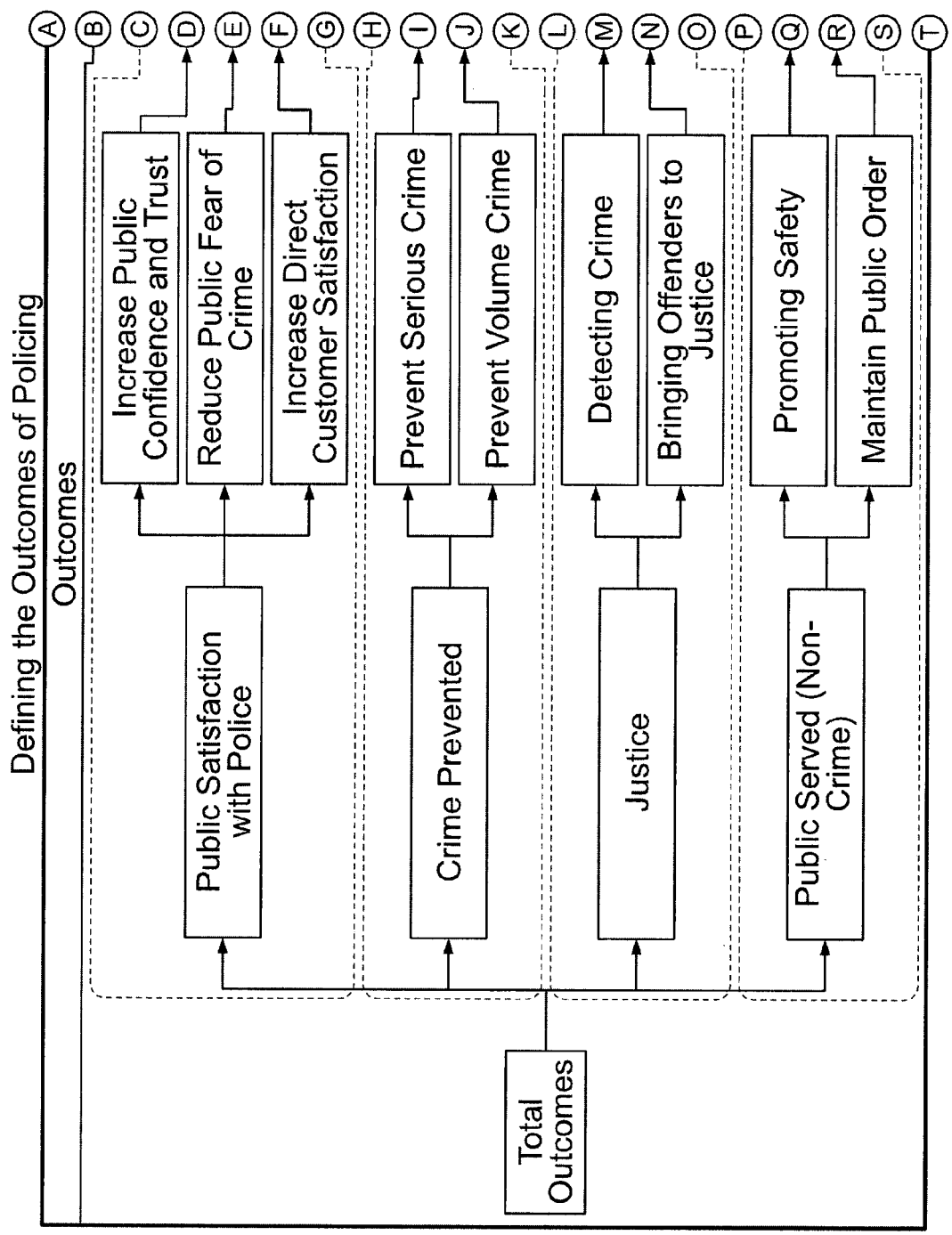
Figures 2, 15A:
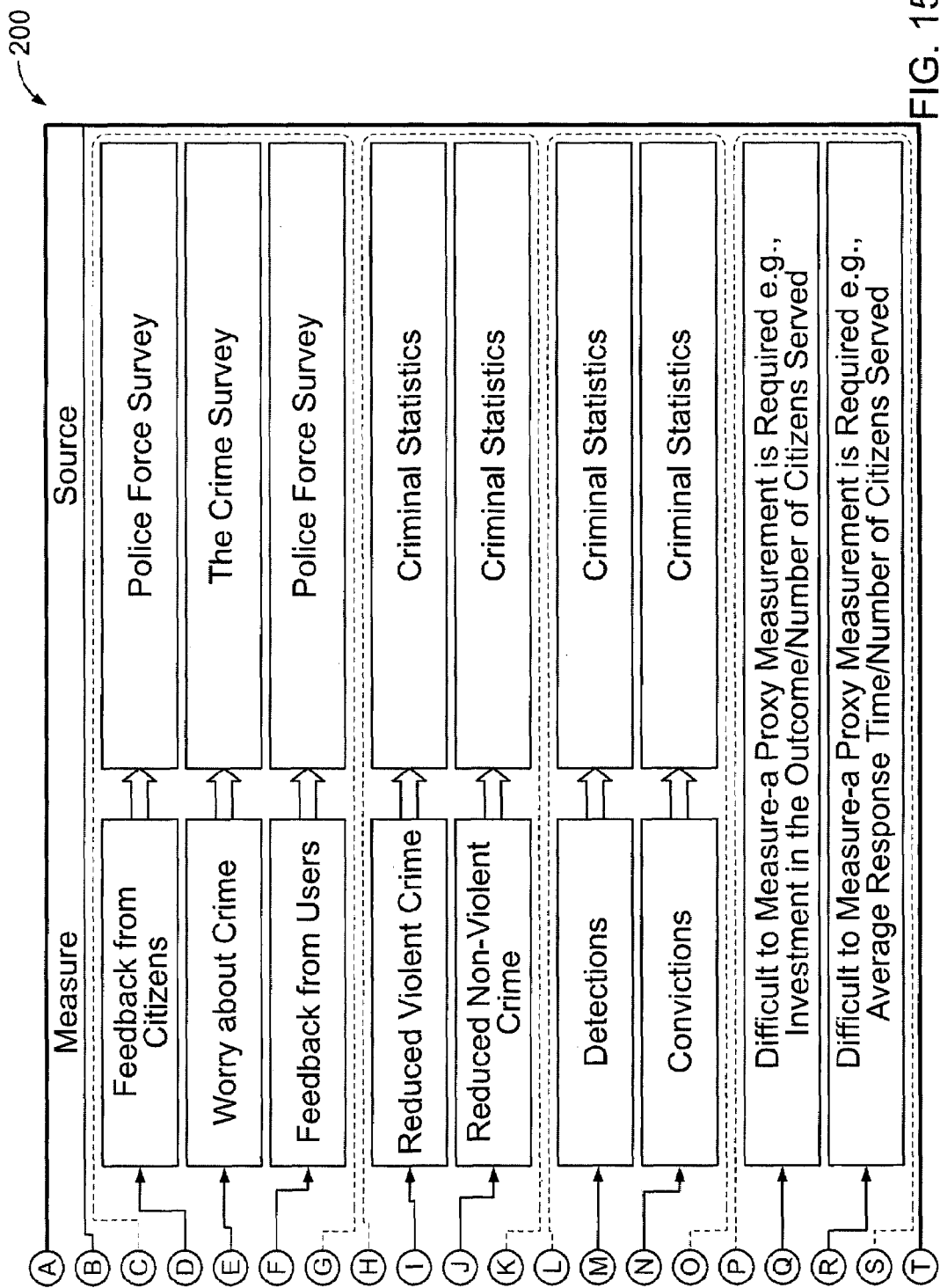

FIG. 15A is a diagram 200 of outcomes drivers of a public sector organization according to an implementation of the invention. In the police organization example, the PSV model 60 identifies outcomes that are relevant to the organization such as "public satisfaction with the police", "crime prevented", "justice", and "public served (non-crime)". Each outcome can be further subdivided, for example, the outcome related to "public satisfaction with police" may include sub-outcomes such as "increase public confidence and trust", "reduce public fear of crime", and "increase direct customer satisfaction." Once the outcomes have been identified, the model 60 provides a measure for each outcome (and sub-outcome) which can be obtained from one or more sources. For example, a measure of the sub-outcome "increase public confidence and trust" can be obtained by "feedback from citizens" obtained from the "Police Force Survey." A total outcome is calculated for one or more police forces in a geographic area such as a country, region, city, or other geographic area.

FIG. 15B is a plot diagram 210 of a PSV model 60 of one or more public sector organizations according to an implementation of the invention. The plot has a vertical axis labeled "Outcomes" representing outcomes produced by police organizations and a horizontal axis labeled "Cost effectiveness" representing the cost-effectiveness of achieving the outcomes. In this example, the public value of approximately 18 police organizations have been calculated and plotted. For example, "Police A" appears to have a relatively good level of outcomes, but has an opportunity to improve cost-effectiveness. In contrast, "Police B" appears to have low level of outcomes so it may have to focus on improving its weighted basket of outcomes.

Figures 1, 15C:
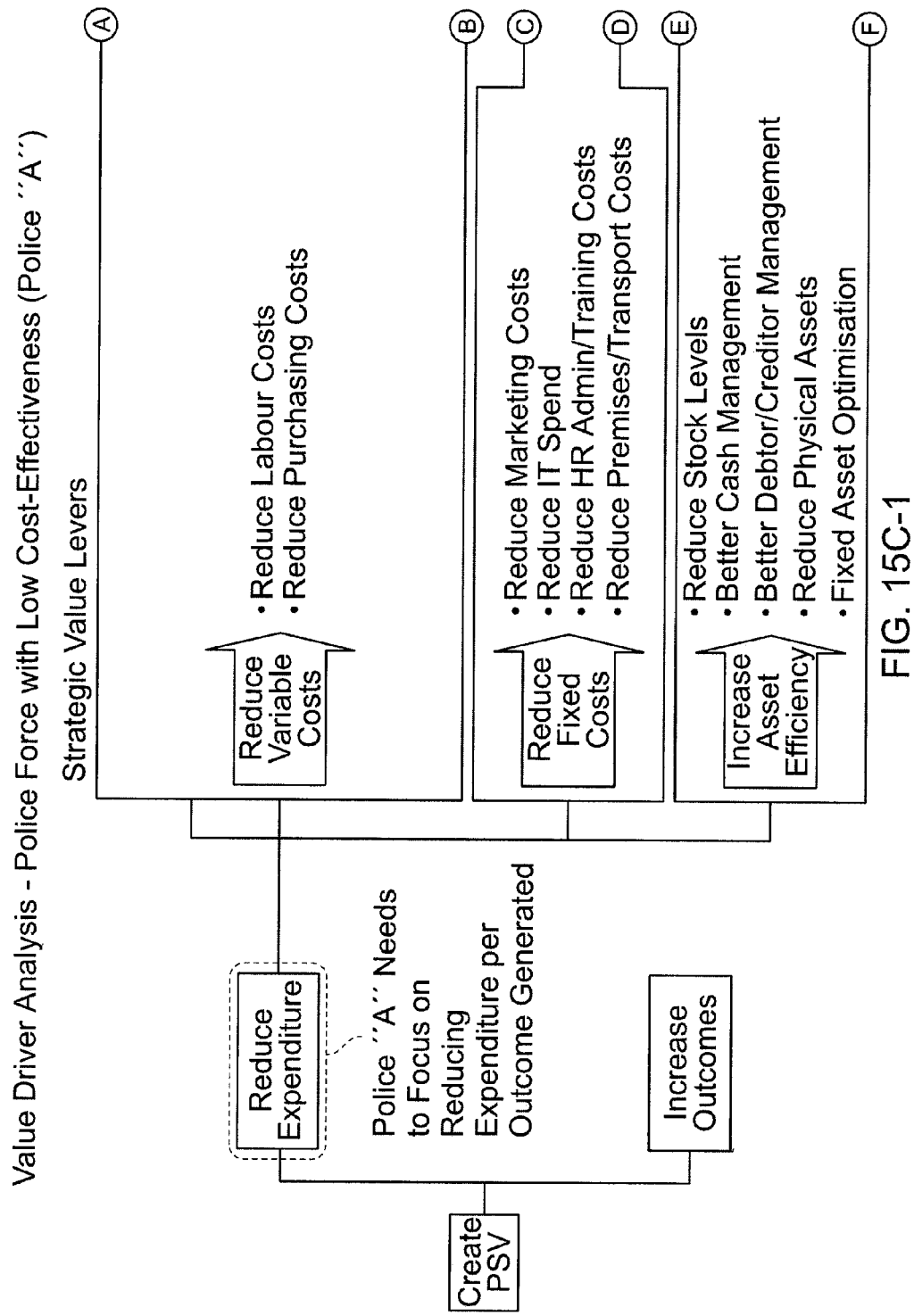
Figures 2, 15C:
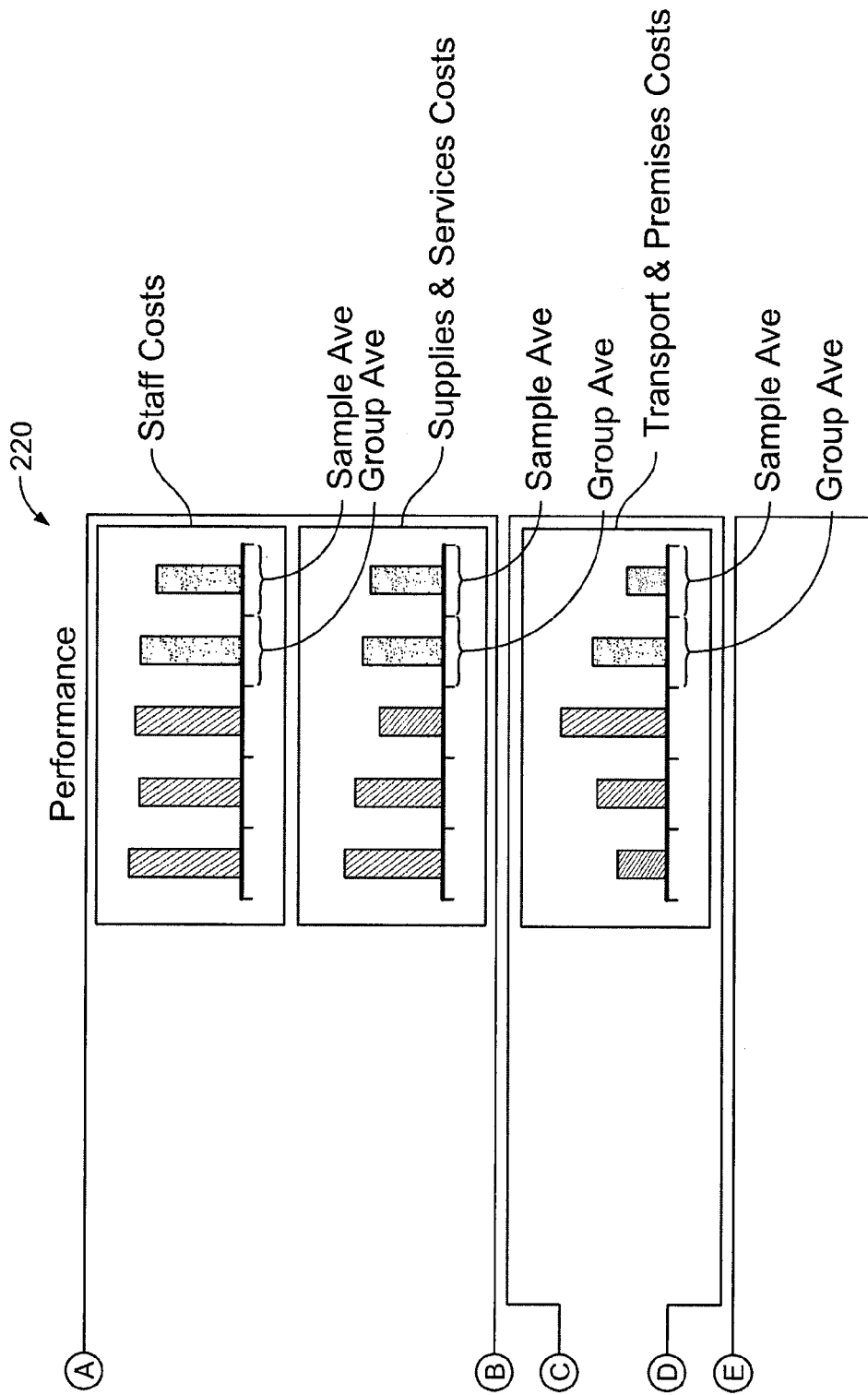

FIG. 15C is a block diagram 220 of analysis of a PSV model 60 of one public sector organization ("Police A") according to an implementation of the invention. The PSV model 60 reveals that "Police A" may need to focus on increasing cost-effectives by, for example, reducing expenditure per outcome generated. The model 60 identifies cost-effectiveness drivers such as "reduce variable costs", "reduce fixed costs", and "increase asset efficiency". Performance data based on the public value data of the organizations is analyzed to determine a potential opportunity for improvement in public value. For example, labor costs for "Police A" appear to be higher than the group of organizations and the sample average. In fact, labor costs appear to be the highest of all police organizations analyzed in this example. With respect, to supplies and services costs, "Police A" is also higher than the group and the sample average. Thus, "Police A" can improve its public value by reducing expenditures. Specifically, "Police A" can focus on reducing variable costs including labor costs and/or reducing supplies and services costs.

FIG. 15D is a block diagram 230 of analysis of a PSV model 60 of one public sector organizations according to an implementation of the invention. Once the PSV model 60 has identified outcomes and/or cost-effectiveness drivers that can be improved, then the model identifies one or market offerings that can improve a particular driver to improve public value of an organization. In this example, "Police A" can improve its public value by reducing variable cost. This may be achieved by obtaining consulting services and/or solutions such as "Human Performance", "Integrate Web Services", "Procurement Process Enhancement", "eProcurement", "Supplier Managed Procurement." In addition, the PSV model 60 identifies other offerings to reduce fixed cost and increase asset efficiency.

Figures 1, 15E:
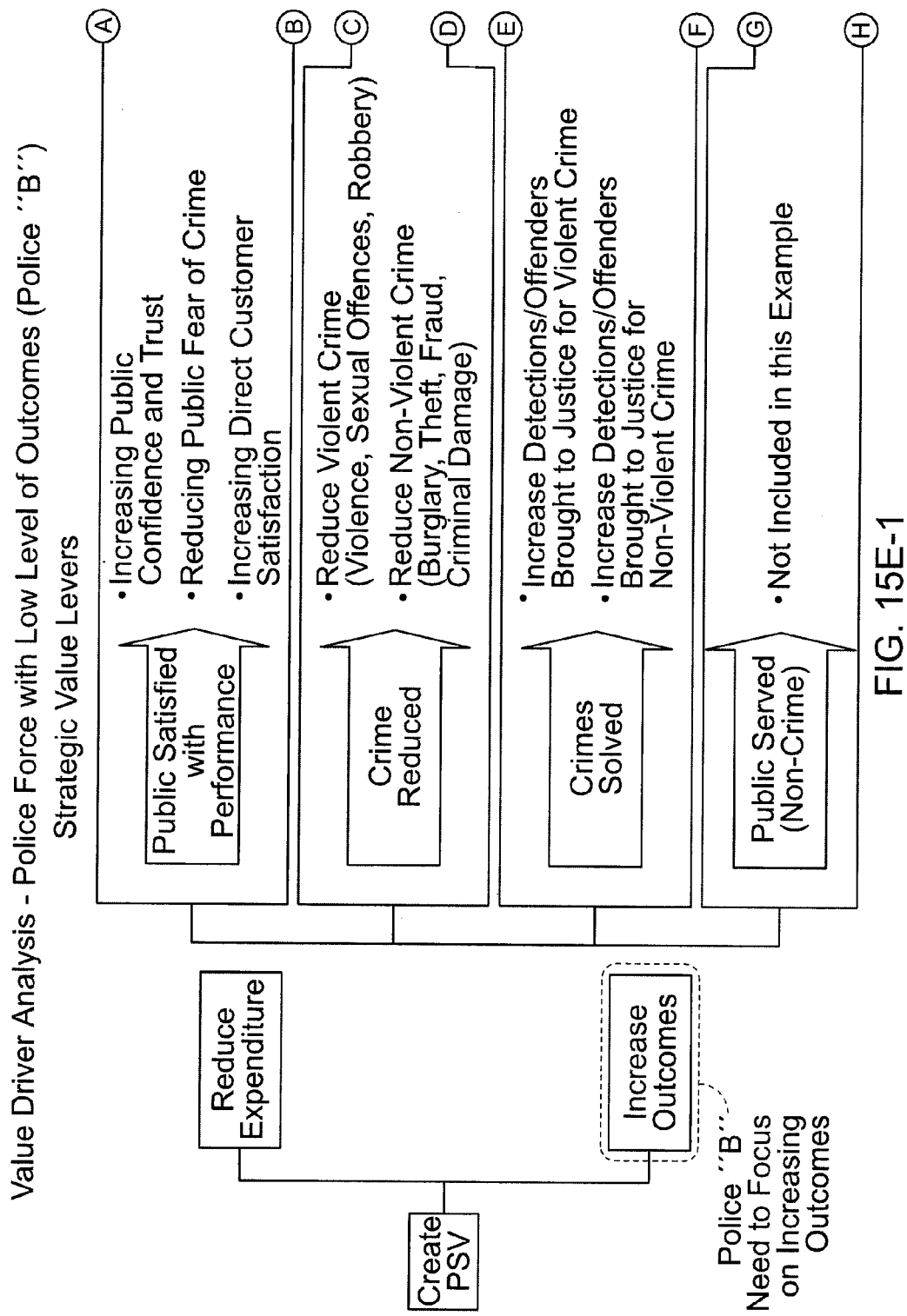
Figures 2, 15E:
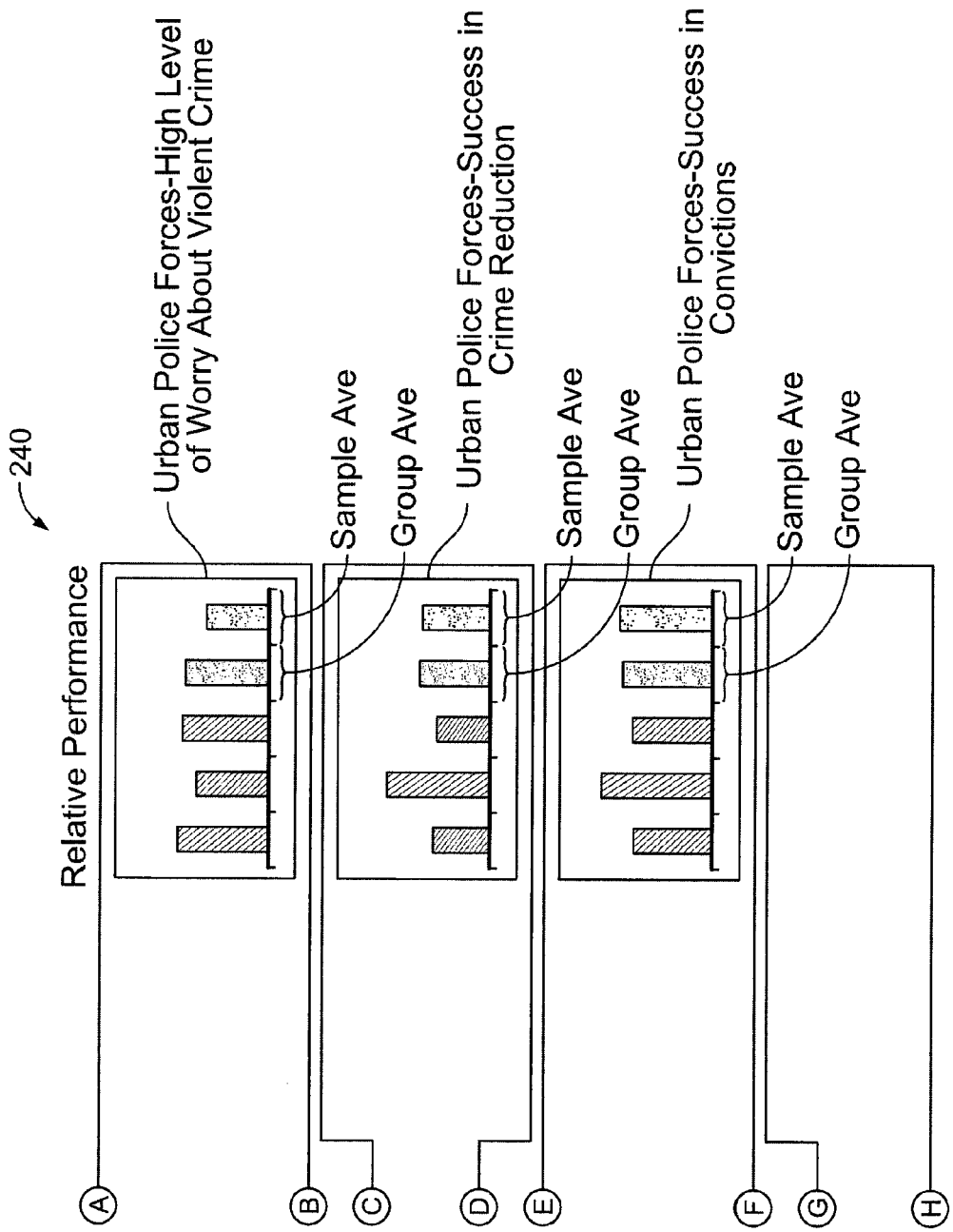

FIG. 15E is a block diagram 240 of analysis of a PSV model 60 of another public sector organization ("Police B") according to an implementation of the invention. The PSV model 60 reveals that "Police B" may need to focus on increasing outcomes. The model 60 identifies outcomes such as, for example, "Public Satisfaction with Performance", "Crime Reduction", "Crimes Solved", and "Public Served."

Relative Performance data based on the public value data of the organizations is analyzed to determine any potential opportunity for improvement in public value. For example, in the context of "public satisfaction with performance", the data suggests that "Police B" performs poorly relative to the group average. Likewise, "Police B" appears to perform very poorly relative to the sample average. In contrast, "Police B" performs significantly better than others in the group. Thus, "Police B" can improve its public value by increasing outcomes. Specifically, "Police B" can focus on improving "Public Satisfaction with Performance" and/or "crimes solved."

Figure 15F:
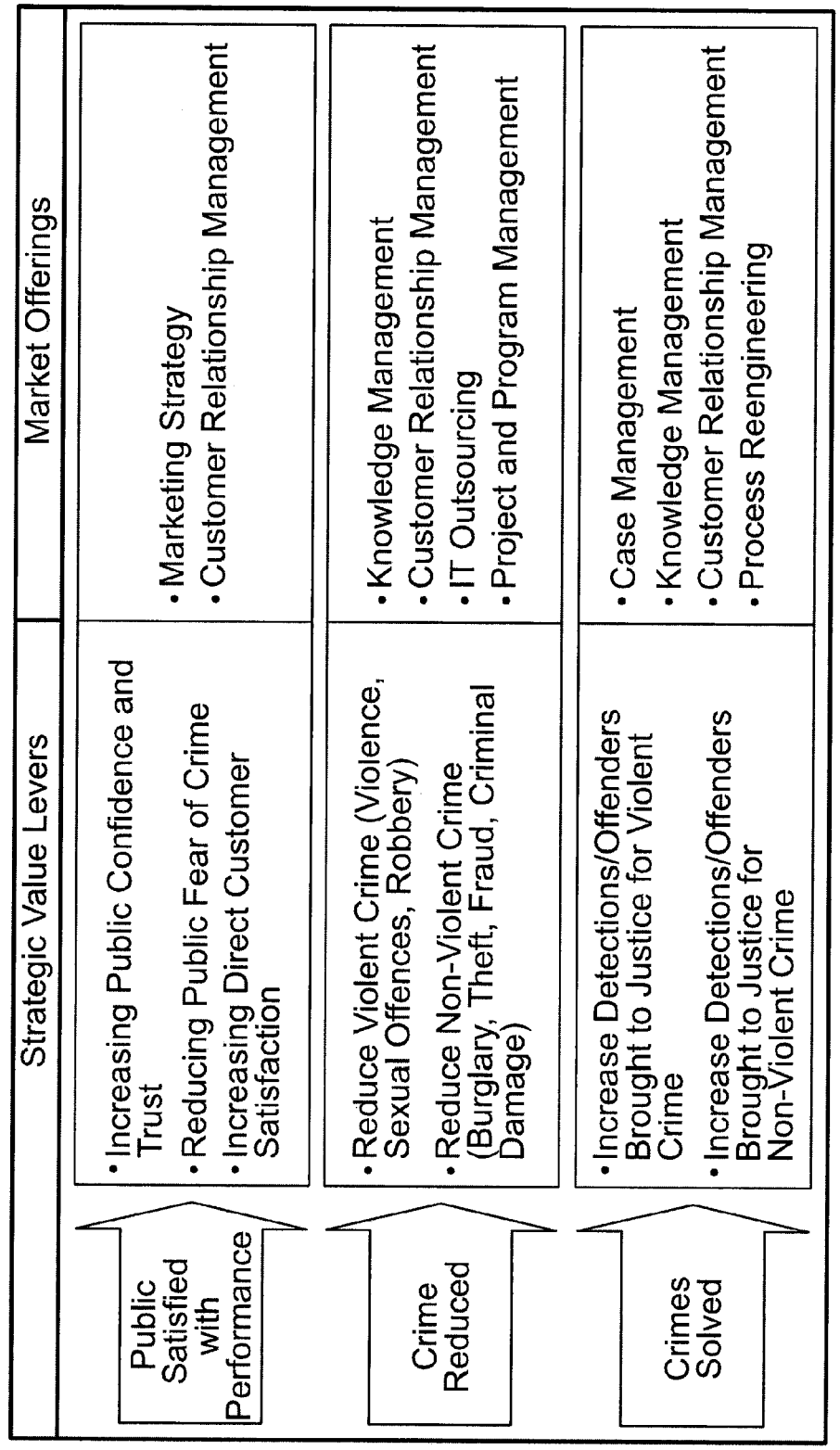

FIG. 15F is a block diagram 250 of analysis of a PSV model 60 of a public sector organization ("Police B") according to an implementation of the invention. Once the PSV model 60 has identified outcomes and/or cost-effectiveness drivers that can be improved, then the model identifies one or market offerings that can improve a particular driver to improve public value of an organization. In this example, "Police B" can improve its public value by increasing its "public satisfaction with performance". This may be achieved by obtaining consulting services and/or solutions such as "Market Strategy", "Customer Relationship Management." In addition, the PSV model 60 identifies other offerings for "Crime Reduction" and "Crimes Solved."

Figure 16:
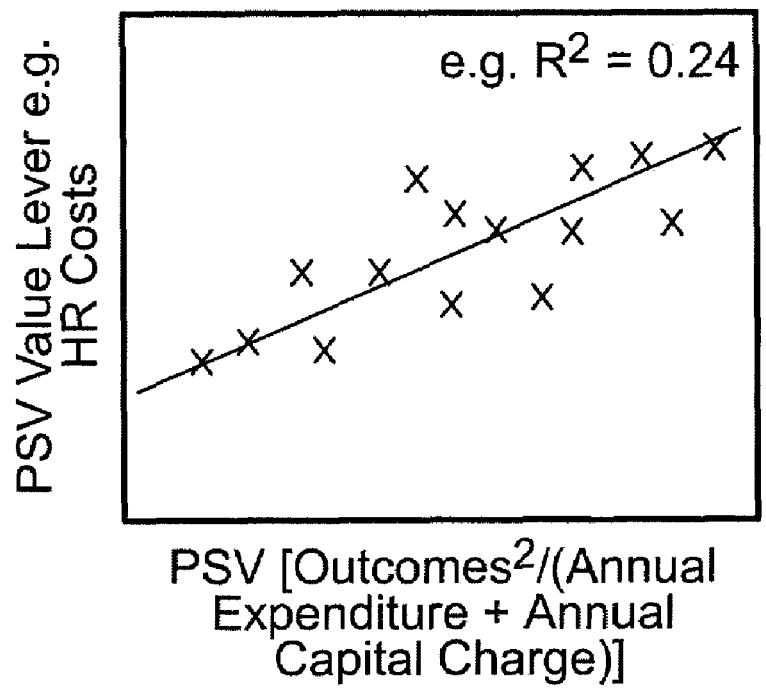
FIG. 16 is a graph of a plot of an industry analysis according to an implementation of the invention.

FIG. 16 represents a graph 290 of a plot of an industry analysis. This analysis includes identifying one or more critical drivers (i.e. determinants such as labor costs, IT costs, HR costs) of value within a particular industry. An objective of the analysis is to identify one or more means of improving the public value by improving/investing in a particular driver. For example, focusing in on the cost-effectiveness driver of PSV model 60, a reduction in HR costs (or overhead costs) may be a value driver (the curve should be downward sloping). In another example, on the outcome driver side of the PSV model 60 focused in the public health industry, health outcomes may be driven by proactive health advice rather than treatment, and therefore, more funds should be invested prevention rather than a cure. In another example, on the outcome driver side of the PSV model 60 in the public welfare industry, expenditure on advertising to notify fraud detection may be more effective than fraud inspection/audit, and therefore funds may be shifted from inspection to advertising.

System Implementation

Figure 17:
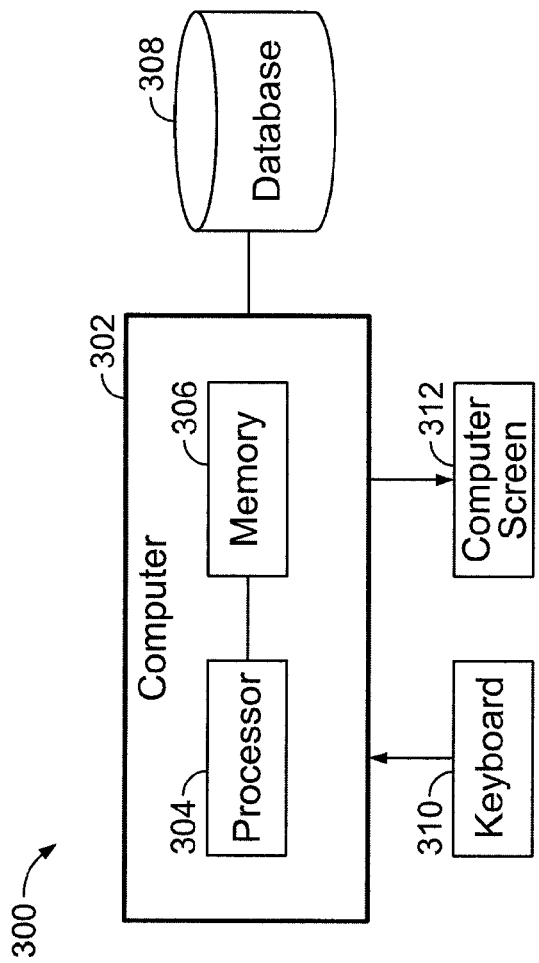
FIG. 17 is a block diagram of a computer system for implementing a method of producing a public sector value according to an implementation of the invention.

FIG. 17 is a block diagram of a computer system 300 for implementing a PSV model 60 according to an implementation of the invention. A standard computer system (e.g. client/server configuration, personal computer) can be used to implement the functions of the system 10 shown in FIG. 1. Such a system 300 may include a computer 302 having a processor 304 and memory 306 capable of executing one or more programs to perform the functions of the method 20 and a database 24 for managing data associates with method. The database 24 can be stored for example in hard disk or other suitable storage.

The computer system can include a network interface (not shown) having hardware and software components to allow users access to the system 10 over a network such as the World Wide Web using, for example, Web pages. The network interface may allow the system 300 to receive information such as outcome measures and cost-effectiveness measures related to a public sector organization 12. A keyboard 310 can be used to input information to the computer 300 and a computer screen 312 can be used to display information from the computer.

Figure 18:
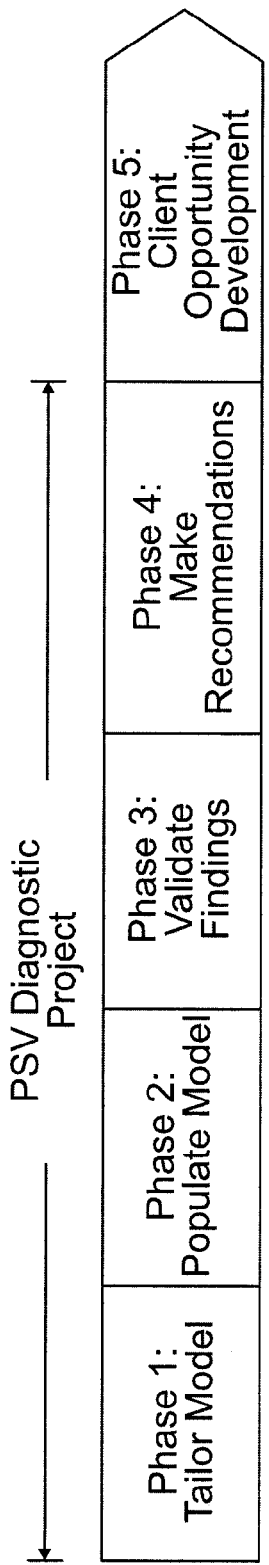
FIG. 18 illustrates a methodology for developing a public sector value model.

Referring to FIG. 18, the methodology for developing a public sector value (PSV) model is summarized.

In Phase 1, the model is tailored to reflect the focus of the agency based on available data. At this phase, the role of the PSV team is to conduct an initial "kick-off" meeting with the client. The PSV team can obtain the client's perspective on model outcomes, metrics, etc. During this phase, a member of the Client team can introduce the PSV concept to other employees of the client and provides client background information to the PSV team.

In Phase 2, the PSV model is populated with client data. The role of the PSV team is to work with the client to collect appropriate data (with the assistance of the Client team). The PSV team also makes adjustments to budget data for calculating the capital charge (if necessary) and runs the PSV model.

In Phase 3, findings from the PSV model are validated. In particular, the trends in the analysis are confirmed and a storyline is developed. In particular, the analysis, performance trends, and performance are validated by the Client team, the industry experts, and by the client in general, in that order.

In Phase 4, final recommendations to the client are made based on data trends. For example, the findings from Phase 3are used to identify recommendations for addressing problems. The PSV model is then finalized.

In Phase 5, the final recommendations are used to determine possible client business opportunities. In particular, the findings from the PSV model can be matched with services and products offered by, for example, the industry experts.

A number of embodiments of the invention have been described. Nevertheless, it will be understood that various modifications may be made without departing from the spirit and scope of the invention. For example, the functionality of the method 10 can be implemented using one or more computers distributed across a network. Accordingly, other embodiments are within the scope of the following claims.

What is claimed is:

1. A computer system comprising:
  a database for maintaining data associated with a public sector organization that includes at least two outcome measures and at least one cost-effectiveness measure; and
  a computer coupled to the database, wherein the computer includes a processor and a memory, the processor and memory configured to:
    access, from electronic storage, a public sector value model that corresponds to a public sector organization and that defines:
      at least two outcome measures that each correspond to a non-monetary social benefit achieved by the public sector organization,
      weightings that correspond to each of the outcome measures and that define a relative weight given to the corresponding outcome measure, the weightings reflecting relative significance of the corresponding non-monetary social benefit to public value provided by the public sector organization, and
      at least one cost-effectiveness measure that relates to costs incurred by the public sector organization in achieving the outcomes and that includes reduction of variable cost, reduction of fixed cost, and increase in asset efficiency;
    obtain, from public data sources, performance measurements corresponding to the at least two outcome measures, the performance measurements being indicative of the public sector organization's level of achievement of the non-monetary social benefits corresponding to the at least two outcome measures;

obtain cost measurements corresponding to the at least one cost-effectiveness measure, the cost measurements being indicative of the public sector organization's variable costs, fixed costs, and available assets;

compute, using the public sector value model, a performance value by removing impact of exogenous factors on the performance measurements corresponding to the at least two outcome measures and applying the corresponding weightings to the performance measurements, the exogenous factors being factors that affect the performance measurements corresponding to the at least two outcome measures, but are not the responsibility of the public sector organization;

compute, using the public sector value model, a cost-effectiveness value as a ratio of the computed performance value and an operating cost of the public sector organization determined using the obtained cost measurements;

determine a relative public performance measure of the public sector organization based on the computed performance value, an average performance value relevant to the public sector organization, the computed cost-effectiveness value, and an average cost-effectiveness value relevant to the public sector organization;

generate, based on the determined relative public performance measure of the public sector organization, a public sector value matrix that graphically reflects the computed performance value for the public sector organization relative to the average performance value and that graphically reflects the computed cost-effectiveness value for the public sector organization relative to the average cost-effectiveness value;

compare the relative public performance measure of the public sector organization with performance trends; and based on the comparison of the relative public performance measure of the public sector organization with performance trends, identify a recommendation on how the public sector organization can improve the relative public performance measure, wherein removing the impact of exogenous factors on the performance measurements corresponding to the at least two outcome measures comprises developing a final performance score for each of the at least two outcome measures that takes into account an understanding of a relationship between key socioeconomic factors and the non-monetary social benefits that correspond to the at least two outcome measures.

2. The computer system of claim 1 wherein the processor is configured to compute, using the public sector value model, a cost-effectiveness value by computing a cost-effectiveness value as a ratio of the computed performance value over a combination of annual expenditure and capital charge.

3. The computer system of claim 1 wherein the public sector organization includes at least one of: public health, revenue service, educational, police, courts, probation, fire, public transport, prisons, customs, immigration, postal services, regulatory bodies, public housing, defense, social security, customs, and public welfare.

4. The computer system of claim 3 wherein, in the police organization, an outcome measure includes at least one of: public satisfaction with the police organization, reduction of crime, solving a crimes, and public served; and cost-effectiveness measure includes at least one of: reduction of variable cost, reduction of fixed cost, increase in asset efficiency.

5. The computer system of claim 3 wherein, in the public health organization, an outcome measure includes at least one of: improved health care, reduced errors in prescriptions; and cost-effectiveness measure includes at least one of: reduction of variable cost, reduction of fixed cost, increase in asset efficiency.

6. The computer system of claim 3 wherein, in the revenue service organization, an outcome measure includes at least one of: improved tax compliance, citizen satisfaction; and cost-effectiveness measure includes at least one of: reduction of variable cost, reduction of fixed cost, increase in asset efficiency.

7. The computer system of claim 1 wherein the processor is programmed to provide a recommendation to the public sector organization that includes at least one proposed solution to improve the relative performance measure of the public sector organization.

8. The computer system of claim 1 wherein the processor is programmed to provide a recommendation to the public sector organization that includes at least one consulting service to improve the relative performance measure of the public sector organization.

9. The computer system of claim 1 wherein the processor is programmed to determine a relative performance measure includes evaluating the performance of the public sector organization as a function of time.

10. The computer system of claim 9 wherein the processor is programmed to derive a proposed solution for improving the relative performance measure on the basis of evaluating the performance of the public sector organization as a function of time.

11. The computer system of claim 1 wherein determining a relative performance measure includes evaluating the performance of the public sector organization by comparing one public sector organization having one relative performance measure to another public sector organization having another relative performance measure.

12. The computer system of claim 11 wherein the processor is programmed to derive a proposed solution for improving a relative performance measure on the basis of comparing one public sector organization having one relative performance measure to another public sector organization having another relative performance measure.

13. The computer system of claim 1, wherein the processor is programmed to use the relative performance measure to perform a correlation analysis between the relative performance measure and a particular outcome measure or a particular cost-effectiveness measure.

14. A non-transitory computer program product, tangibly embodied in a computer-readable medium, the non-transitory computer program product being operable to cause a data processing apparatus to:

access, from electronic storage, a public sector value model that corresponds to a public sector organization and that defines:

at least two outcome measures that each correspond to a non-monetary social benefit achieved by the public sector organization, weightings that correspond to each of the outcome measures and that define a relative weight given to the corresponding outcome measure, the weightings reflecting relative significance of the corresponding non-monetary social benefit to public value provided by the public sector organization, and at least one cost-effectiveness measure that relates to costs incurred by the public sector organization in achieving the outcomes and that includes reduction of variable cost, reduction of fixed cost, and increase in asset efficiency;

obtain, from public data sources, performance measurements corresponding to the at least two outcome measures, the performance measurements being indicative of the public sector organization's level of achievement of the non-monetary social benefits corresponding to the at least two outcome measures;

obtain cost measurements corresponding to the at least one cost-effectiveness measure, the cost measurements being indicative of the public sector organization's variable costs, fixed costs, and available assets;

compute, using the public sector value model, a performance value by removing impact of exogenous factors on the performance measurements corresponding to the at least two outcome measures and applying the corresponding weightings to the performance measurements, the exogenous factors being factors that affect the performance measurements corresponding to the at least two outcome measures, but are not the responsibility of the public sector organization;

compute, using the public sector value model, a cost-effectiveness value as a ratio of the computed performance value and an operating cost of the public sector organization determined using the obtained cost measurements;

determine a relative public performance measure of the public sector organization based on the computed performance value, an average performance value relevant to the public sector organization, the computed cost-effectiveness value, and an average cost-effectiveness value relevant to the public sector organization;

generate, based on the determined relative public performance measure of the public sector organization, a public sector value matrix that graphically reflects the computed performance value for the public sector organization relative to the average performance value and that graphically reflects the computed cost-effectiveness value for the public sector organization relative to the average cost-effectiveness value;

compare the relative public performance measure of the public sector organization with performance trends; and based on the comparison of the relative public performance measure of the public sector organization with performance trends, identify a recommendation on how the public sector organization can improve the relative public performance measure, wherein removing the impact of exogenous factors on the performance measurements corresponding to the at least two outcome measures comprises developing a final performance score for each of the at least two outcome measures that takes into account an understanding of a relationship between key socioeconomic factors and the non-monetary social benefits that correspond to the at least two outcome measures.

15. A method comprising:

accessing, from electronic storage, a public sector value model that corresponds to a public sector organization and that defines:

at least two outcome measures that each correspond to a non-monetary social benefit achieved by the public sector organization, weightings that correspond to each of the outcome measures and that define a relative weight given to the corresponding outcome measure, the weightings reflecting relative significance of the corresponding non-monetary social benefit to public value provided by the public sector organization, and at least one cost-effectiveness measure that relates to costs incurred by the public sector organization in achieving the outcomes and that includes reduction of variable cost, reduction of fixed cost, and increase in asset efficiency;

obtaining, using a computer processor and from public data sources, performance measurements corresponding to the at least two outcome measures, the performance measurements being indicative of the public sector organization's level of achievement of the non-monetary social benefits corresponding to the at least two outcome measures;

obtaining, using the computer processor, cost measurements corresponding to the at least one cost-effectiveness measure, the cost measurements being indicative of the public sector organization's variable costs, fixed costs, and available assets;

computing, using the computer processor and applying the public sector value model, a performance value by removing impact of exogenous factors on the performance measurements corresponding to the at least two outcome measures and applying the corresponding weightings to the performance measurements, the exogenous factors being factors that affect the performance measurements corresponding to the at least two outcome measures, but are not the responsibility of the public sector organization;

computing, using the computer processor and applying the public sector value model, a cost-effectiveness value as a ratio of the computed performance value and an operating cost of the public sector organization determined using the obtained cost measurements;

determining, using the computer processor, a relative public performance measure of the public sector organization based on the computed performance value, an average performance value relevant to the public sector organization, the computed cost-effectiveness value, and an average cost-effectiveness value relevant to the public sector organization;

generating, using the computer processor and based on the determined relative public performance measure of the public sector organization, a public sector value matrix that graphically reflects the computed performance value for the public sector organization relative to the average performance value and that graphically reflects the computed cost-effectiveness value for the public sector organization relative to the average cost-effectiveness value;

comparing, using the computer processor, the relative public performance measure of the public sector organization with performance trends; and based on the comparison of the relative public performance measure of the public sector organization with performance trends, identifying, using the computer processor, a recommendation on how the public sector organization can improve the relative public performance measure, wherein removing the impact of exogenous factors on the performance measurements corresponding to the at least two outcome measures comprises developing a final performance score for each of the at least two outcome measures that takes into account an understanding of a relationship between key socioeconomic factors and the non-monetary social benefits that correspond to the at least two outcome measures.

16. The method of claim 15 wherein computing, using the public sector value model, a cost-effectiveness value comprises computing a cost-effectiveness value as a ratio of the computed performance value over a combination of annual expenditure and capital charge.

17. The method of claim 15 wherein the public sector organization includes at least one of: public health, revenue service, educational, police, courts, probation, fire, public transport, prisons, customs, immigration, postal services, regulatory bodies, public housing, defense, social security, customs, and public welfare.

18. The method of claim 17 wherein, in the police organization, an outcome measure includes at least one of: public satisfaction with the police organization, reduction of crime, solving a crimes, and public served; and
cost-effectiveness measure includes at least one of: reduction of variable cost, reduction of fixed cost, increase in asset efficiency.

19. The method of claim 17 wherein, in the public health organization, an outcome measure includes at least one of: improved health care, reduced errors in prescriptions; and
cost-effectiveness measure includes at least one of: reduction of variable cost, reduction of fixed cost, increase in asset efficiency.

20. The method of claim 17 wherein, in the revenue service organization, an outcome measure includes at least one of: improved tax compliance, citizen satisfaction and
cost-effectiveness measure includes at least one of: reduction of variable cost, reduction of fixed cost, increase in asset efficiency.

21. The method of claim 15 further comprising providing a recommendation to the public sector organization that includes at least one proposed solution to improve the relative performance measure of the public sector organization.

22. The method of claim 15 further comprising providing a recommendation to the public sector organization that includes at least one consulting service to improve the relative performance measure of the public sector organization.

23. The method of claim 15 wherein determining a relative performance measure includes evaluating the performance of the public sector organization as a function of time.

24. The method of claim 23 further comprising deriving a proposed solution for improving the relative performance measure on the basis of evaluating the performance of the public sector organization as a function of time.

25. The method of claim 15 wherein determining a relative performance measure includes evaluating the performance of the public sector organization by comparing one public sector organization having one relative performance measure to another public sector organization having another relative performance measure.

26. The method of claim 25 further comprising deriving a proposed solution for improving a relative performance measure on the basis of comparing one public sector organization having one relative performance measure to another public sector organization having another relative performance measure.

27. The method of claim 26, further comprising using the relative performance measure to perform a correlation analysis between the relative performance measure and a particular outcome measure or a particular cost-effectiveness measure.

28. The method of claim 15 further comprising:
accessing past performance values for the public sector organization, each past performance value corresponding to a particular period of time in the past;
computing an average performance value for the public sector organization based on the past performance values;
accessing past cost-effectiveness values for the public sector organization, each past cost-effectiveness value corresponding to a particular period of time in the past;
computing an average cost-effectiveness value for the public sector organization based on the past cost-effectiveness values,
wherein determining a relative public performance measure of the public sector organization comprises determining a relative public performance measure of the public sector organization based on the computed performance value, the computed average performance value for the public sector organization, the computed cost-effectiveness value, and the computed average cost-effectiveness value for the public sector organization.

29. The method of claim 28 further comprising:
displaying a graphical representation of the determined relative public performance measure of the public sector organization with respect to the computed average performance value for the public sector organization and the computed average cost-effectiveness value for the public sector organization.

30. The method of claim 29 wherein displaying a graphical representation of the determined relative public performance measure of the public sector organization with respect to the computed average performance value for the public sector organization and the computed average cost-effectiveness value for the public sector organization comprises:
displaying an axis with the computed average performance value for the public sector organization and the computed average cost-effectiveness value for the public sector organization being an origin of the axis; and
displaying, with respect to the axis, an indication of the determined relative public performance measure of the public sector organization that reflects relative public performance of the public sector organization with respect to the computed average performance value for the public sector organization and the computed average cost-effectiveness value for the public sector organization.

31. The method of claim 30 further comprising:
displaying, with respect to the axis, indications of past relative public performance measures of the public sector organization that each reflect relative public performance of the public sector organization with respect to the computed average performance value for the public sector organization and the computed average cost-effectiveness value for the public sector organization for a particular period of time in the past.

32. The method of claim 15 further comprising:
accessing performance values for other public sector organizations, each performance value corresponding to a particular public sector organization that is different than the public sector organization;
computing an average performance value for a public sector industry based on the accessed performance values;
accessing cost-effectiveness values for the other public sector organizations, each cost-effectiveness value corresponding to a particular public sector organization that is different than the public sector organization;
computing an average cost-effectiveness value for the public sector industry based on the accessed cost-effectiveness values, wherein determining a relative public performance measure of the public sector organization comprises determining a relative public performance measure of the public sector organization based on the computed performance value, the computed average performance value for the public sector industry, the computed cost-effectiveness value, and the computed average cost-effectiveness value for the public sector industry.

33. The method of claim 32 further comprising:
displaying a graphical representation of the determined relative public performance measure of the public sector organization with respect to the computed average performance value for the public sector industry and the computed average cost-effectiveness value for the public sector industry.

34. The method of claim 33 wherein displaying a graphical representation of the determined relative public performance measure of the public sector organization with respect to the computed average performance value for the public sector industry and the computed average cost-effectiveness value for the public sector industry comprises:
displaying an axis with the computed average performance value for the public sector industry and the computed average cost-effectiveness value for the public sector industry being an origin of the axis; and
displaying, with respect to the axis, an indication of the determined relative public performance measure of the public sector organization that reflects relative public performance of the public sector organization with respect to the computed average performance value for the public sector industry and the computed average cost-effectiveness value for the public sector industry.

35. The method of claim 34 further comprising:
displaying, with respect to the axis, indications of relative public performance measures of the other public sector organizations that each reflect relative public performance of a particular public sector organization that is different than the public sector organization with respect to the computed average performance value for the public sector industry and the computed average cost-effectiveness value for the public sector industry.

36. The method of claim 15 wherein:
wherein accessing, from electronic storage, a public sector value model comprises accessing a public sector value model that defines:
a first outcome measure for the public sector organization,
a first weighting value associated with the first outcome measure, the first weighting value corresponding to a relative weight of the first outcome measure in the public sector value model,
a second outcome measure for the public sector organization, the second outcome measure being different than the first outcome measure, and
a second weighting value corresponding to the second outcome measure, the second weighting value being different than the first weighting and corresponding to a relative weight of the second outcome measure in the public sector value model;
wherein obtaining measurements corresponding to the at least two outcome measures comprises:
receiving, for the public sector organization, a first measurement corresponding to the first outcome measure, and
receiving, for the public sector organization, a second measurement corresponding to the second outcome measure; and wherein computing, using the public sector value model, a performance value comprises:
applying the first weighting value to the first measurement to achieve a first result,
applying the second weighting value to the second measurement to achieve a second result, and
calculating a performance value for the public sector organization based on the first result and the second result.

37. The method of claim 15:
wherein accessing, from electronic storage, a public sector value model that corresponds to a public sector organization and that defines at least two outcome measures that correspond to outcomes achieved by the public sector organization comprises accessing a public sector value model that defines a first outcome measure, a first weighting value for the first outcome measure, at least two sub-outcome measures that define the first outcome measure, and weightings that correspond to each of the sub-outcome measures and that define a relative weight given to the corresponding sub-outcome measure in computing a value for the first outcome measure,
wherein obtaining measurements corresponding to the at least two outcome measures comprises obtaining measurements for each of the sub-outcome measures;
wherein computing, using the public sector value model, a performance value comprises:
computing a first value for the first outcome measure based on the measurements for each of the sub-outcome measures and the weightings that correspond to each of the sub-outcome measures, and
computing a performance value based on the computed first value for the first outcome measure and at least one other value for another outcome measure that is different than the first outcome measure and that is defined by the public sector value model.

38. The method of claim 15 wherein computing, using the public sector value model, a cost-effectiveness value comprises computing a cost-effectiveness value by dividing a first value that represents a total of beneficial outcomes achieved by the public sector organization by a second value computed as a sum of annual expenditure of the public sector organization minus capital expenditure of the public sector organization and annual capital charge of the public sector organization.

39. The method of claim 15 wherein:
obtaining measurements corresponding to the at least one cost-effectiveness measure comprises obtaining a measurement related to variable costs of the public sector organization in achieving the outcomes; and
computing, using the public sector value model, a cost-effectiveness value comprises computing, using the public sector value model, a cost-effectiveness value that reflects variable costs of the public sector organization in achieving the outcomes based on the measurement related to variable costs of the public sector organization in achieving the outcomes.

40. The method of claim 15 wherein:
obtaining measurements corresponding to the at least one cost-effectiveness measure comprises obtaining a measurement related to fixed costs of the public sector organization in achieving the outcomes; and
computing, using the public sector value model, a cost-effectiveness value comprises computing, using the public sector value model, a cost-effectiveness value that reflects fixed costs of the public sector organization in achieving the outcomes based on the measurement related to fixed costs of the public sector organization in achieving the outcomes.

41. The method of claim 15 wherein:
obtaining measurements corresponding to the at least one cost-effectiveness measure comprises obtaining a measurement related to asset efficiency of the public sector organization in achieving the outcomes; and
computing, using the public sector value model, a cost-effectiveness value comprises computing, using the public sector value model, a cost-effectiveness value that reflects asset efficiency of the public sector organization in achieving the outcomes based on the measurement related to asset efficiency of the public sector organization in achieving the outcomes.

42. The method of claim 15 further comprising:
automatically, without human intervention, identifying a particular outcome measure that needs improvement for the public sector organization based on obtained measurements associated with the particular outcome measure; and
automatically, without human intervention, displaying the particular outcome measure that needs improvement for the public sector organization.

43. The method of claim 42 wherein automatically, without human intervention, identifying a particular outcome measure that needs improvement for the public sector organization comprises:
comparing values for outcome measures for the public sector organization with values for the outcome measures for public sector organizations other than the public sector organization; and
based on the comparison, identifying the particular outcome measure that needs improvement for the public sector organization.

44. The method of claim 42 further comprising:
automatically, without human intervention, identifying a service directed to improving the particular outcome measure; and
automatically, without human intervention, displaying the identified service.

45. The method of claim 15 further comprising:
determining, using the computer processor, the weightings based on results of public surveying, examination of social and economic cost of the corresponding non-monetary social benefit, and preferences indicated by government industries.

46. The method of claim 15 wherein removing the impact of exogenous factors on the performance measurements corresponding to the at least two outcome measures comprises grouping public sector organizations together based on common socioeconomic factors and producing a baseline for each group, thereby excluding exogenous factors.

47. The computer system of claim 1 wherein removing the impact of exogenous factors on the performance measurements corresponding to the at least two outcome measures comprises grouping public sector organizations together based on common socioeconomic factors and producing a baseline for each group, thereby excluding exogenous factors.

* * * * *

UNITED STATES PATENT AND TRADEMARK OFFICE
CERTIFICATE OF CORRECTION

Page 1 of 1

PATENT NO. : 7,822,633 B2
APPLICATION NO. : 10/664797
DATED : October 26, 2010
INVENTOR(S) : Lisa H. Neuberger et al.

It is certified that error appears in the above-identified patent and that said Letters Patent is hereby corrected as shown below:

Title Page, Col. 2 under Other Publications, Line 7, delete "manadement" and insert
-- management --;

Title Page, Col. 2 under Other Publications, Line 7, delete "secotr" and insert -- sector --; and Column 25, Line 29, Claim 20, delete "satisfaction" and insert -- satisfaction; --.

Signed and Sealed this
Eighteenth Day of January, 2011

David J. Kappos
*Director of the United States Patent and Trademark Office*